US012634532B2

(12) United States Patent
Clucas

(10) Patent No.: US 12,634,532 B2
(45) Date of Patent: May 19, 2026

(54) SECURE DECODER AND SECURE DECODING METHODS

(71) Applicant: V-NOVA INTERNATIONAL LTD, London (GB)

(72) Inventor: Richard Clucas, London (GB)

(73) Assignee: V-NOVA INTERNATIONAL LTD, London (GB)

( * ) Notice: Subject to any disclaimer, the term of this patent is extended or adjusted under 35 U.S.C. 154(b) by 262 days.

(21) Appl. No.: 18/549,867

(22) PCT Filed: May 17, 2022

(86) PCT No.: PCT/GB2022/051238
§ 371 (c)(1),
(2) Date: Sep. 8, 2023

(87) PCT Pub. No.: WO2022/243672
PCT Pub. Date: Nov. 24, 2022

(65) Prior Publication Data
US 2024/0305839 A1 Sep. 12, 2024

(30) Foreign Application Priority Data

May 17, 2021 (GB) ..................................... 2107036

(51) Int. Cl.
*H04N 21/2343* (2011.01)
*H04N 21/4405* (2011.01)

(52) U.S. Cl.
CPC .............. *H04N 21/234327* (2013.01); *H04N 21/44055* (2013.01)

(58) Field of Classification Search
None
See application file for complete search history.

(56) References Cited

U.S. PATENT DOCUMENTS 6,957,350 B1 10/2005 Demos
10,397,616 B2 * 8/2019 Dong ..................... H04N 19/70
(Continued)

OTHER PUBLICATIONS

International Search Report and Written Opinion received for PCT Patent Application No. PCT/GB2022/051238, mailed on Aug. 1, 2022, 15 pages.
(Continued)

*Primary Examiner* — Peter D Le
(74) *Attorney, Agent, or Firm* — Workman Nydegger

(57) ABSTRACT

A module having access to a secure memory and an unsecure memory, the module configured to: read, from the secure memory via a secure channel, a decrypted decoded rendition of a base layer of a video signal, wherein the decrypted decoded rendition of the base layer has a first resolution; read, from the unsecure memory, a decoded rendition of an enhancement layer of the video signal, wherein decoded rendition of the enhancement layer has a second resolution, wherein the second resolution is higher than the first resolution; generate an upsampled decrypted decoded rendition of the base layer of the video signal by upsampling the decrypted decoded rendition of the base layer such that the upsampled decrypted decoded rendition of the base layer has the second resolution; apply the decoded rendition of the enhancement layer to the upsampled decrypted decoded rendition of the base layer to generate an output plane; output the output plane, via the secured channel, to the secure memory for storage in the secure memory, wherein the output plane is for use in outputting by an output module to a display.

19 Claims, 10 Drawing Sheets

(56) References Cited

U.S. PATENT DOCUMENTS

| | | | | |
|---|---|---|---|---|
| 2002/0150158 A1* | 10/2002 | Wu | H04N 19/51 | 375/240.12 |
| 2004/0196975 A1* | 10/2004 | Zhu | H04N 21/23473 | 380/258 |
| 2005/0185795 A1* | 8/2005 | Song | H04N 7/1675 | 348/E7.056 |
| 2009/0187772 A1* | 7/2009 | Lange | H04N 7/165 | 713/193 |
| 2010/0260260 A1* | 10/2010 | Wiegand | H04N 19/59 | 375/E7.243 |
| 2011/0064220 A1* | 3/2011 | Chen | H04N 21/835 | 348/E13.001 |
| 2011/0316972 A1* | 12/2011 | Demas | H04N 13/30 | 348/E13.001 |
| 2013/0230096 A1* | 9/2013 | Lasserre | H04N 19/126 | 382/233 |
| 2016/0070887 A1* | 3/2016 | Wu | G06F 21/84 | 713/189 |
| 2019/0098052 A1* | 3/2019 | Kim | H04L 63/0485 | |
| 2023/0100615 A1* | 3/2023 | Yuan | G06T 3/4053 | 348/43 |

OTHER PUBLICATIONS

Manoranjan et al, "Media Data Protection during Execution on Mobile Platforms – A Review," Jul. 4, 2014.

Meardi Guido et al, "MPEG-5 part 2: Low Complexity Enhancement Video Coding (LCEVC): Overview and performance evaluation", SPIE Proceedings; [Proceedings of SPIE ISSN 0277-786X], SPIE, US,vol. (0} 11510, Aug. 21, 2020 (Aug. 21, 2020), p. 115101C-115101C, XP06013371 DOi: 10.1117/122569246 / ISBN: 9781510636736.

Text of ISO/IEC 23001-7z2016 DAM 2 Improvements on selective encryption, 134. MPEG MEETING; Apr. 26, 2021-Apr. 30, 2021; Online; (Motion Picture Expert Group or ISO/IEC JTC1/SC29NVG11), No. n20298 May 7, 2021.

VR Industry Forum, "This Draft Deliverable Is Being Offered Without Any Warranty Whatsoever, and in Particular, Any Warranty of Non-Infringement Is Expressly Disclaimed, Any Use of This Draft Deliverable Shall Be Made Entirely at the Implementer's Own Risk, and Neither VRIF, Nor Any of Its Members or Contributors, SHAL," ITU-T Draft; Study Period 2017-2020; Study Group 15; Series TD308/GEN ATT.I, International Telecommunication Union.

* cited by examiner

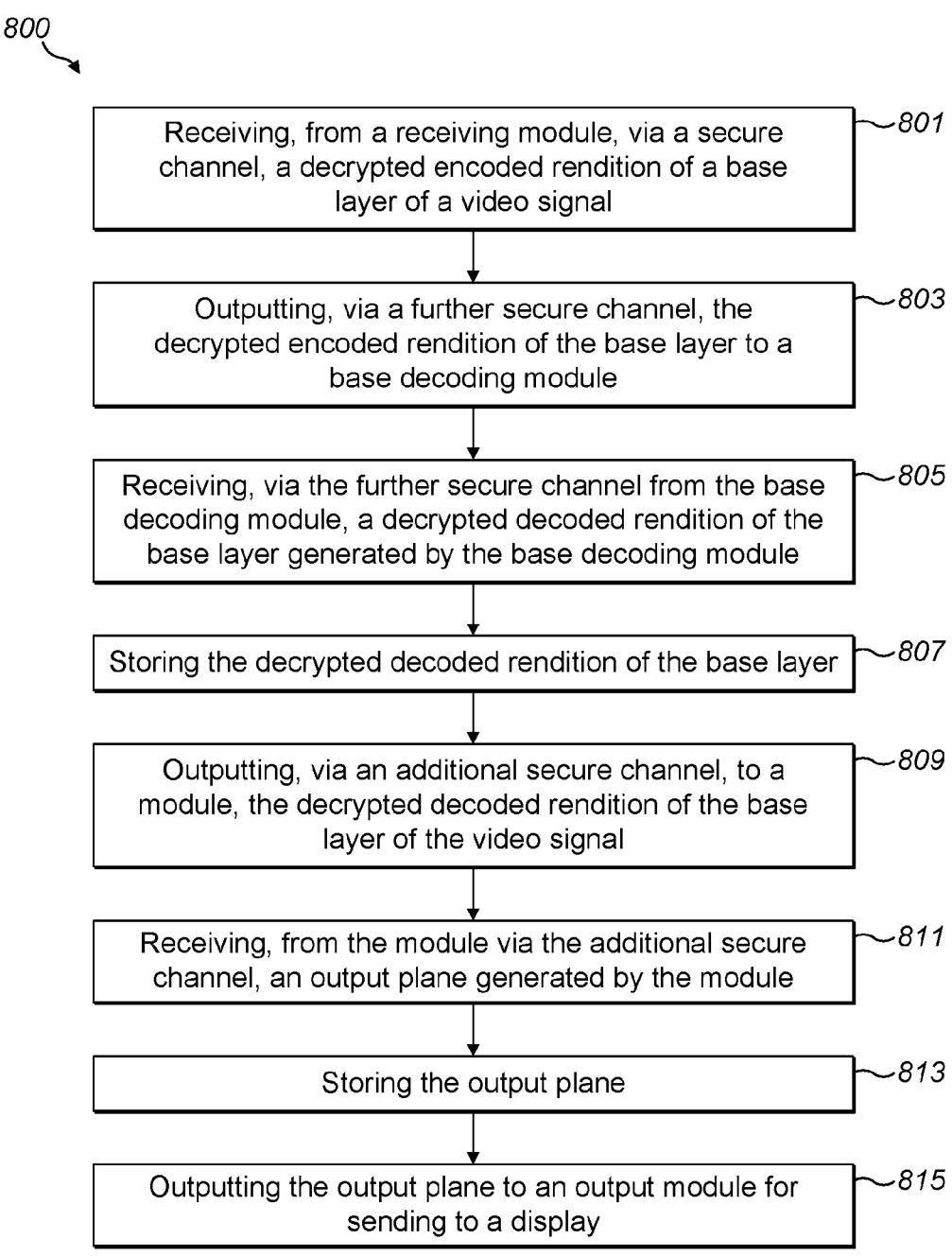

*800*

Receiving, from a receiving module, via a secure channel, a decrypted encoded rendition of a base layer of a video signal — *801*

Outputting, via a further secure channel, the decrypted encoded rendition of the base layer to a base decoding module — *803*

Receiving, via the further secure channel from the base decoding module, a decrypted decoded rendition of the base layer generated by the base decoding module — *805*

Storing the decrypted decoded rendition of the base layer — *807*

Outputting, via an additional secure channel, to a module, the decrypted decoded rendition of the base layer of the video signal — *809*

Receiving, from the module via the additional secure channel, an output plane generated by the module — *811*

Storing the output plane — *813*

Outputting the output plane to an output module for sending to a display — *815*

*FIG. 8*

SECURE DECODER AND SECURE DECODING METHODS

CROSS-REFERENCE TO RELATED APPLICATIONS

This application is a 371 US Nationalization of International Application No. PCT/GB2022/051238, filed May 17, 2022, which claims priority to GB Patent Application No. 2107036.2, filed May 17, 2021, the disclosures of which are hereby incorporated by reference herein in their entirety.

TECHNICAL FIELD

The present invention relates to computing systems for decoding signals, such as video signals. The present invention specifically relates to decoding protected content in a secure manner.

BACKGROUND

A hybrid backward-compatible coding technology has been previously proposed, for example in WO 2013/171173, WO 2014/170819, WO 2019/141987, and WO 2018/046940, the contents of which are incorporated herein by reference. Further examples of tier-based coding formats include ISO/IEC MPEG-5 Part 2 LCEVC (hereafter "LCEVC"). LCEVC has been described in WO 2020/188273A1, GB2018723.3, WO/2020/188242, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020, all of these documents being incorporated by reference herein in their entirety.

In these coding formats a signal is decomposed in multiple "echelons" (also known as "hierarchical tiers") of data, each corresponding to a "Level of Quality", from the highest echelon at the sampling rate of the original signal to a lowest echelon. The lowest echelon is typically a low quality rendition of the original signal and other echelons contain information on correction to apply to a reconstructed rendition in order to produce the final output.

LCEVC adopts this multi-layer approach where any base codec (for example Advanced Video Coding—AVC, also known as H.264, or High Efficiency Video Coding—HEVC, also known as H.265) can be enhanced via an additional low bitrate stream. LCEVC is defined by two component streams, a base stream typically decodable by a hardware decoder and an enhancement stream consisting of one or more enhancement layers suitable for software processing implementation with sustainable power consumption. The enhancement provides improved compression efficiency to existing codecs, and reduces encoding and decoding complexity.

Since LCEVC and similar coding formats leverage existing decoders and are inherently backwards-compatible, there exists a need for efficient and effective integration with existing video coding implementations without complete re-design. Examples of known video coding implementations include the software tool FFmpeg, which is used by the simple media player FFplay.

Moreover, LCEVC is not limited to known codecs and is theoretically capable of leveraging yet-to-be-developed codecs. As such any LCEVC implementation should be capable of integration with any hitherto known or yet-to-be-developed codec, implemented in hardware or software, without introducing coding complexity.

Moreover, MPEG-5 Part 2 Low Complexity Enhancement Video Coding (LCEVC) is a new video standard by MPEG. It specifies an enhancement layer which, when combined with a base video encoded with a separate (existing) codec, produces an enhanced video stream. It is suitable for software processing implementation with sustainable power consumption. The enhancement stream provides new features such as:

Extending the compression capability of the base codec

Lowering encoding and decoding complexity

Providing a platform for additional future enhancements

LCEVC works by encoding a lower resolution version of a source image using any existing codec (the base codec) and the difference between the reconstructed lower resolution image and the source using a different compression method (the enhancement.).

The remaining details that make up the difference with the source are efficiently and rapidly compressed with LCEVC, which uses specific tools designed to compress residual data. The LCEVC enhancement compresses residual information on at least two layers, one at the resolution of the base to correct artefacts caused by the base encoding process and one at the source resolution that adds details to reconstruct the output frames. Between the two reconstructions the picture is upscaled using either a normative up-sampler or a custom one specified by the encoder in the bitstream. In addition, LCEVC also performs some non-linear operations called residual prediction, which further improve the reconstruction process preceding residual addition, collectively producing a low-complexity smart content-adaptive (i.e., encoder driven) upscaling.

LCEVC is an enhancement codec, meaning that it does not just up-sample well: it will also encode the residual information necessary for true fidelity to the source and compress it (transforming, quantizing and coding it). LCEVC can also produce mathematically lossless reconstructions, meaning all of the information can be encoded and transmitted and the image perfectly reconstructed. Creator's intent, small text, logos, ads and unpredictable high-resolution details are preserved with LCEVC.

As an example:

LCEVC can deliver 2160p 10-bit HDR video over an 8-bit AVC base encoder.

When using an HEVC base encoder for a 2160p stream, LCEVC can deliver the same quality at typically 33% less of the original bitrate i.e., lower a typical bitrate of 20 Mbit/s (HEVC only) to 15 Mbit/s or lower (LCEVC on HEVC).

LCEVC also allows for high-density processing for sustainable green data centers. By 2022, video viewing will account for 82% of all internet traffic, with internet traffic accounting for well over 1% of global emissions (Cisco Visual Networking Index). Increased demand for video services is driving the roll out of video technology with higher impact on energy consumption. LCEVC is uniquely placed to reduce this impact being the only compression standard to simultaneously improve quality of service whilst reducing the energy cost of encoding.

The many unique benefits of LCEVC can be summarized as follows. LCEVC . . .

rapidly enhances the quality and cost efficiency of all codec workflows.

reduces processing power requirements for serving a given resolution.

is deployable via software, resulting in much lower power consumption.

simplifies the transition from older generation to newer generation codecs.

improves engagement by increasing visual quality at a given bitrate.

is retrofittable and backward compatible.

is immediately deployable at scale via software update.

has low battery consumption on user devices.

reduces new codecs complexity and makes them readily deployable.

With a view to all of the above, LCEVC allows for some interesting and highly economic ways to utilize legacy devices/platforms for higher resolutions and frame rates without the need to swap the entire hardware, ignoring customers with legacy devices, or creating duplicate services for new devices. That way the introduction of higher quality video services on legacy platforms at the same time generates demand for devices with even better coding performance. In addition, LCEVC not only eliminates the need to upgrade the platform, but it also allows for delivery of higher resolution content over existing delivery networks that might have limited bandwidth capability.

The approach of LCEVC being a codec agnostic enhancer based on a software-driven implementation, which leverages available hardware acceleration, also shows in the wider variety of implementation options on the decoding side. While existing decoders are typically implemented in hardware at the bottom of the stack, LCEVC basically allows for implementation on a variety of levels i.e., from Scripting and Application to the OS and Driver level and all the way to the SoC and ASIC. In other words, there is more than one solution to implement LCEVC on the decoder side. Generally speaking, the lower in the stack the implementation takes place, the more device specific the approach becomes. And except for an implementation on ASIC level, no new hardware is needed. This does, create challenges with regard to security, especially with a view to premium content and the resulting requirements. Embodiment of the present invention aim to overcome such challenges, especially in relation to secure decoding of protected (e.g. premium) content.

SUMMARY

In general, there are two common approaches to secure video delivery: Conditional Access (CA) and Digital Rights Management (DRM). Conditional Access, used in the more traditional broadcast world with a physical authentication system (typically a smartcard). For online content distribution operators generally use Digital Rights Management (DRM). The aim of both of these approaches is clear: to prevent consumers getting illegal access to the content and to then freely distribute that content to other people.

With regards to protection, there are generally three areas that need to be considered: the compressed video stream should be encrypted; the output of the then decrypted video stream to the display should be through a protected pipe, e.g. using High-bandwidth Digital Content Protection (HDCP); and it should not be possible for software to 'capture' the content from the decoded and decrypted video. The latter can be achieved by having a secure platform that doesn't allow the execution of unapproved software, or by utilising a secure memory controller that prevents general access to the 'secure' memory.

A common teaching of the prior art is that secure video delivery can only be achieved with 'hardware' decoders, that way basically condemning primarily software-based approaches. In contrast, a more accurate and nuanced approach of that statement was considered when developing the described embodiments of the invention. This nuanced approach determined that a decoder could be configured to utilize hardware protection in the decoding system. In practice, a CPU typically can't read the video memory (i.e. a secure memory), but other hardware blocks can usually read the video memory (i.e. a secure memory), moreover, the GPU can usually read the video memory (i.e. a secure memory) in a protected mode.

The described embodiments are further based on a consideration that only a relatively small portion of the LCEVC (or other tier based encoding systems) implementation on the decoder side is actually critical in regard of content security, namely only the upscaling of the decoded base layer (and other operations using the upscaled decoded base layer).

As for the base layer, this is processed by the existing base decoder that is typically implemented in hardware, meeting Encoded Content Protection (ECP) requirements. Furthermore, this part of the LCEVC (or other tier based codec) stream is—by design—downscaled typically to a quarter of the original resolution i.e., in case of a 2160p transmission the base layer will be encoded in HD resolution.

Regarding the (e.g. LCEVC) enhancement layer, this only contains residual information and is of no particular value (with regards to security) before it has been combined with the upscaled decoded base layer. Implementing the enhancement decoder in software therefore does not present any particular security risk. An example of a residual map can be seen in FIG. 10. As can be seen in FIG. 10, a potential consumer would get no real benefit from (and no motivation to) illegally copying and/or distributing the enhancement layer to other people.

The security relevant part of the tier based (e.g. LCEVC) decoder implementation lies in the processing steps where the decoded enhancement layer is combined with the decoded (and upscaled) base layer to create the final output sequence. Depending on what level of the stack the tier based (e.g. LCEVC) decoder is being implemented, different approaches exist to establish a secure and ECP compliant content workflow.

As explained above, handling the decoding of the LCEVC enhancement layer in the General Purpose Memory (i.e. unsecure memory) does not present a security risk due to the lack of value of the residual information that layer contains (illustrated in FIG. 10). With the base decoder utilizing the Secure Memory, the challenge lies in how to combine the output from the base decoder in Secure Memory and the LCEVC decoder output in General Purpose Memory to assemble the enhanced output sequence. Embodiments of the present invention solve this problem via two similar approaches: a number of the embodiments of the present invention provide a secure decoder when LCEVC is implemented at a driver level implementation; whereas other embodiments of the present invention provide a secure decoder when LCEVC is implemented at a System on a Chip (SoC) level. Which approach of the two is utilized depends on the capabilities of the chipset used in the respective decoding device.

The embodiments of the present invention that implement LCEVC (or other tier based codecs) on a device driver level utilise hardware blocks or GPU. In general, once the base layer and the (e.g. LCEVC) enhancement layer have been separated, most of the decoding of the (e.g. LCEVC) enhancement layer takes place in the CPU and hence in General Purpose (unsecure) Memory. A module (e.g. a secure hardware block or GPU) is used to up-sample the output of the base encoder using Secure Memory, combines the upsampled output with predicted residuals and applies the decoded enhancement layer (e.g. LCEVC residual map) coming from General Purpose (unsecure) Memory. Afterwards, the output sequence (e.g. an output plane) is sent to a protected display via an output module (e.g. a Video Shifter), which is part of an output video path in the decoder (i.e. in the chipset). Generally speaking, this implementation is in line with the appended claim 1 and the FIGS. 5 and 6. Such embodiments will now be described in more detail, whilst maintaining a level of generality.

According to a first aspect of the invention, there is provided a module having access to a secure memory and an unsecure memory. The unsecure memory may be considered a general purpose memory. Another term for access is that the module has the rights (or permission) to access (for example read from) the secure memory, in accordance with a typical memory access system. The module may therefore be considered as a computational unit that can access the secure memory, and that work in conjunction with computing units that do not have access to secure memory to perform a method. The module may be configured to read, from the secure memory via a secured channel, a decrypted decoded rendition of a base layer of a video signal, wherein the decrypted decoded rendition of the base layer has a first resolution. The video signal may be considered to be premium video content. The video signal may be considered to be protected video content. The module may be configured to read, from the unsecure memory (e.g. via an unsecured channel), a decoded rendition of an enhancement layer of the video signal. The decoded rendition of the enhancement layer has a second resolution. The second resolution may be higher than the first resolution, however, this is not essential. The second resolution may be the same as the first resolution, in which case, upsampling may not be performed on the decrypted decoded rendition of the base layer (the enhancement layer still provides enhancement, even in such an embodiment, such a mode is described in the published LCEVC standard which is incorporated by reference, see above). The module may be configured to generate an upsampled decrypted decoded rendition of the base layer of the video signal by upsampling the decrypted decoded rendition of the base layer such that the upsampled decrypted decoded rendition of the base layer has the second resolution. The module may be configured to apply the decoded rendition of the enhancement layer to the upsampled decrypted decoded rendition of the base layer to generate an output plane. In an example, the module may be configured to apply the decoded rendition of the enhancement layer to the upsampled decrypted decoded rendition of the base layer by overlaying the decoded rendition of the enhancement layer onto the upsampled decrypted decoded rendition of the base layer. More generally, the module may be configured to combine the decoded rendition of the enhancement layer to the upsampled decrypted decoded rendition of the base layer to generate the output plane. The output plane may comprise a plane of pixels. The output plane may be considered as a rendition of the video signal, the rendition being suitable for supplying to a display for displaying the video associated with the video signal.

The module may be configured to output the output plane, via a secure channel (e.g. the secure channel connecting the module to the secure memory), to the secure memory for storage in the secure memory. The output plane may be for use in outputting by an output module to a display, in particular a protected display.

Advantageously, embodiments of the driver level implementation provide a flexible solution (that also processes the data in an efficient manner).

When the module is a hardware block, the hardware block can be used to process the data very efficiently (for example by maximising page efficiency Double Data Rate, DDR, memory).

However, not all devices have these hardware extra blocks, moreover, not all of these blocks can read secure memory. In such cases, it may be preferable to have the module's functionality in a GPU module (which many relevant devices have), this provides a flexible approach and can be implemented on many different devices (including phones). By writing the functionality of the module as a layer running on the GPU (e.g. using open GLES), embodiments of the invention can function on a variety of different GPUs (and hence different devices), this provides a single solution to the problem (i.e. of providing secure video) that can be implemented on many devices. In this sense). This is generally in contrast with, the SoC level implementation described below that are generally a device (video shifter) architecture specific implementation and therefore use a unique solution for each video shifter to, for example, call the correct functions and connecting them up.

The enhancement layer may be considered to be a residual layer. The enhancement layer may be compliant with the LCEVC standard. The enhancement layer may be a residual layer generated by obtaining a difference between an original video signal (having an original resolution) and a reconstituted rendition of the video signal at original resolution, wherein the reconstituted rendition is generated by upsampling a lower resolution rendition of the original video signal. In other words, wherein the enhancement layer is a residual map obtained from a difference between: an original rendition of the video signal, said original rendition having an original resolution; and a reconstituted rendition of the video signal at original resolution, wherein the reconstituted rendition is generated by upsampling a lower resolution rendition of the original video signal.

The module may be configured to generate predicted residuals by processing the upsampled decrypted decoded rendition of the base layer and the decrypted decoded rendition of the base layer. The module may be configured to apply the predicted residuals to the upsampled decrypted decoded rendition of the base layer to generate the output plane. The module may be configured to generate a predicted residual by: determining an average of a (e.g. 2 by 2) block of the upsampled decrypted decoded rendition of the base layer; and finding a difference between the average and a corresponding (e.g. pixel) value of the decrypted decoded rendition of the base layer.

A computing system may comprise the module. The computing system may comprise the secure memory. The module may be a hardware block. A hardware block may comprise the module.

The module may be a GPU. A GPU may comprise the module. The module may be a hardware upscaler that operates in the secure memory. The module may be a processing unit operating in a trusted execution zone.

The secure memory may be configured to receive, from a receiving module, a decrypted encoded rendition of the base layer of the video signal. The secure memory may be configured to store the decrypted encoded rendition of the base layer of the video signal. In other words, the decrypted encoded rendition of the base layer of the video signal is stored in the unsecure memory. The secure memory may be configured to output the decrypted encoded rendition of the base layer to a base decoding module. The secure memory may be configured to receive, from the base decoding module, the decrypted decoded rendition of the base layer of the video signal generated by the base decoding module. The secure memory may be configured to store the decrypted decoded rendition of the base layer. In other words, the decrypted decoded rendition of the base layer is stored in the secure memory. Throughout the description, references to the unsecure memory and/or secure memory outputting data may equivalently be considered as a module reading data stored in the unsecure memory and/or secure memory.

The secure memory may be configured to output via the secure channel, to the module, the decrypted decoded rendition of the base layer of the video signal. The secure memory may be configured to receive, from the module via the secure channel, the output plane generated by the module. The secure memory may be configured to store the output plane. In other words, the output plane is stored in the secure memory.

The secure memory may be configured to output the output plane to an output module. The output module may be a video shifter or output path that can read video frames from memory and output them to a display device. The output module may be able to perform other functions on the input source such as resizing, graphics overlays, sharpening or other filter functions.

The computing system may comprise the secure channel between the secure memory and the module.

The computing system may comprise the unsecure memory. The unsecure memory may be configured to receive, from a receiving module via an unsecured channel, and store an encoded rendition of the enhancement layer of the video signal. In other words, the encoded rendition of the enhancement layer of the video signal is stored in the unsecure memory. The unsecure memory may be configured to output the encoded rendition of the enhancement layer to an enhancement decoding module configured to generate the decoded rendition of the enhancement layer by decoding the encoded rendition of the enhancement layer. The unsecure memory may be configured to receive, from the unsecure decoding module via the unsecured channel, and store the decoded rendition of the enhancement layer. In other words, decoded rendition of the enhancement layer is stored in the unsecure memory. The unsecure decoding module may also be referred to an enhancement layer decoding module.

In an embodiment, the rendition of the enhancement layer is in conformance with a bitstream as defined in the LCEVC standard (the contents of this standard is incorporated by reference). In this embodiment, the unsecure decoding module is configured to decode the encoded rendition of the enhancement layer in conformance with the processing as described in the LCEVC standard.

The computing system may comprise the receiving module. The receiving module may be configured to receive, as a single stream, the video signal, the video signal comprising the encrypted encoded rendition of the base layer and the encoded rendition of the enhancement layer. The receiving module may be configured to separate the video signal into: the encrypted encoded rendition of the base layer and the encoded rendition of the enhancement layer. The term separating is used to describe obtaining two independent streams (i.e. a rendition of the base layer of the video signal and a rendition of the enhancement layer of the video signal) from a single stream of video signal. The receiving module may be configured to separate the video signal into: the encrypted encoded rendition of the base layer and the encoded rendition of the enhancement layer by demultiplexing the video signal. The receiving module may be configured to decrypt the encrypted encoded rendition of the base layer. The receiving module may be configured to output the encoded rendition of the enhancement layer to the unsecure memory. The receiving module may be configured to output the decrypted encoded rendition of the base layer to the secure memory. The received encoded rendition of the enhancement layer may be received in the clear (i.e. not encrypted).

The received encoded rendition of the enhancement layer may be received by the receiving module as an encrypted version of the encoded rendition of the enhancement layer. In such an embodiment, the receiving module may be configured to, before outputting the encoded rendition of the enhancement layer, decrypt the encrypted version of the encoded rendition of the enhancement layer to obtain the encoded rendition of the enhancement layer.

The video signal received may be encrypted, in such embodiments, the receiving module is configured to decrypt the encrypted video signal. The receiving module is configured to separate the decrypted video signal into the encoded rendition of the base layer and the encoded rendition of the enhancement layer.

The computing system may comprise the base decoding module. The base decoding module may be configured to receive the decrypted encoded rendition of the base layer of the video signal. The base decoding module may be configured to decode the decrypted encoded rendition of the base layer to generate a decrypted decoded rendition of the base layer. The base decoding module may be configured to output, to the secure memory for storage, the decrypted decoded rendition of the base layer.

The computing system comprise the output module. The output module may be a video shifter. The output module may be configured to receive, from the secure memory, the output plane. The output module may be configured to output the output plane to a protected display. The outputting of the output plane by the output module may be considered to be part of an output video path in the computing system.

The output module may be configured to: perform one or more of: resizing the output plane, overlaying subtitles onto the output plane; overlay graphics onto the output plane; sharpen the output plane; perform a filter functions on the output plane.

The computing system may further comprise the protected display.

In embodiments, all channels from the secure memory are secured channels. In embodiments, all channels from the unsecure memory are unsecured channels. The channels are communication channels configured to carry data between the two components (e.g. memory, modules) at the end of each channel. A secure channel is configured such that data communicated along the secured channel cannot be tampered with. A secure channel is configured such that data communicated along the secured channel cannot be intercepted. A channel may allow a module to 'read' data from a memory, this is an example of data being communicated along the channel. Channels may also be referred to as pipe. A secure channel may be referred to as a secure pipe or a protected pipe. An example of a secure channel is High-bandwidth Digital Content Protection (HDCP) which requires a secure connection between the display device and the decoding device.

Due to the secure channel with the secure memory, each of: the module; the receiving module; the base decoding module; the output module are considered to be secure modules. In contrast, the enhancement layer decoding module is considered an unsecure module because it does not have access to the secure memory (and further because there is not a secure channel between the secure memory and the enhancement layer decoding module).

According to an aspect of the invention there is provided a mobile phone comprising the described computing system. According to an aspect of the invention there is provided a personal computer comprising the described computing system.

According to an aspect of the invention there is provided a video playback device comprising the described computing system. In particular, according to an aspect of the invention there is provided a TV set top box comprising the described computing system.

There is further provided a TV decoder comprising the described computing system.

According to an aspect of the present invention there is provided a method comprising: reading, from a secure memory via a secured channel, a decrypted decoded rendition of a base layer of a video signal, wherein the decrypted decoded rendition of the base layer has a first resolution; reading, from an unsecure memory, a decoded rendition of an enhancement layer of the video signal, wherein decoded rendition of the enhancement layer has a second resolution, wherein the second resolution is higher than the first resolution; generating an upsampled decrypted decoded rendition of the base layer of the video signal by upsampling the decrypted decoded rendition of the base layer such that the upsampled decrypted decoded rendition of the base layer has the second resolution; applying the decoded rendition of the enhancement layer to the upsampled decrypted decoded rendition of the base layer to generate an output plane; outputting the output plane, via the secured channel, to the secure memory for storage in the secure memory, wherein the output plane is for use in outputting by an output module to a display.

According to a further aspect of the invention there is provided a secure memory configured to: receive, from a receiving module via a secure channel, a decrypted encoded rendition of a base layer of a video signal; output, via a further secure channel, the decrypted encoded rendition of the base layer to a base decoding module; receive, via the further secure channel from the base decoding module, a decrypted decoded rendition of the base layer generated by the base decoding module; store the decrypted decoded rendition of the base layer; output via an additional secure channel, to a module, the decrypted decoded rendition of the base layer of the video signal; receive, from the module via the additional secure channel, an output plane generated by the module; store the output plane; output the output plane to an output module for sending to a display.

According to a further aspect of the invention there a method, the method comprising receiving, from a receiving module, via a secure channel, a decrypted encoded rendition of a base layer of a video signal; outputting, via a further secure channel, the decrypted encoded rendition of the base layer to a base decoding module; receiving, via the further secure channel from the base decoding module, a decrypted decoded rendition of the base layer generated by the base decoding module; storing the decrypted decoded rendition of the base layer; outputting, via an additional secure channel, to a module, the decrypted decoded rendition of the base layer of the video signal; receiving, from the module via the additional secure channel, an output plane generated by the module; storing the output plane; outputting the output plane to an output module for sending to a display.

As described above, some other embodiments of the present invention provide a secure decoder when a tier based codec (e.g. LCEVC) is implemented at a System on a Chip (SoC) level. The embodiments of the present invention that operate with this SoC level implementation are similar in some regards to the Driver level implementation described above. However, the SoC level implementation is based on low level driver entry, which typically requires to work closely with the respective hardware vendors. In general, the embodiments of the present invention that operate with this SoC level implementation utilise a video shifter configured to: up-sample an output of the base encoder (read from Secure Memory), combine the upsampled output with predicted residuals; and apply a decoded enhancement layer (e.g. LCEVC residual map) read from General Purpose (unsecure) Memory. The video shifter then sends the resultant output plane (e.g. output sequence) to a protected display. The video shifter may be within an output path.

According to a further aspect of the present invention, there is further provided an output module having access to a secure memory and to an unsecure memory. The output module may be configured to read, from the secure memory via a secured channel, a decrypted decoded rendition of a base layer of a video signal, the decrypted decoded rendition of the base layer having a first resolution. The output module may be configured to read, from the unsecure memory, a decoded rendition of an enhancement layer of the video signal, the decoded rendition of the enhancement layer having a second resolution, wherein the second resolution is higher than the first resolution. The output module may be configured to generate an upsampled decrypted decoded rendition of the base layer of the video signal by upsampling the decrypted decoded rendition of the base layer such that the upsampled decrypted decoded rendition of the base layer has the second resolution. The output module may be configured to apply the decoded rendition of the enhancement layer to the upsampled decrypted decoded rendition of the base layer to generate an output plane. The output module may be configured to output the output plane, via a further secure channel, to a protected display. The output module may be a video shifter. Advantageously, this is a simple implementation because it does not rely on a further module. This further advantageously means that the implementation can result in high resolution being performed on simple (relatively cheap, low quality) chips because it doesn't rely on a further module (unlike the driver level implementation according to the further aspect of the invention). The described SoC implementation further advantageously uses a low amount of memory bandwidth because it uses fewer communications between the secure memory and other components of the computing system (compared to the driver level implementation according to the further aspect of the invention). For example, in embodiments there is merely a single read (by the video decoder) of the video at a low resolution followed by a single read (by the video shifter) of the enhancement level at a full resolution. In other words, this implementation is a very efficient implementation.

The output module may be configured to generate predicted residuals by processing the upsampled decrypted decoded rendition of the base layer and the decrypted decoded rendition of the base layer. The output module may be configured to apply the predicted residuals to the upsampled decrypted decoded rendition of the base layer to generate the output plane. The output module may be configured to generate a predicted residual by: determining an average of a (e.g. 2 by 2) block of the upsampled decrypted decoded rendition of the base layer; and finding a difference between the average and a corresponding (e.g. pixel) value of the decrypted decoded rendition of the base layer. Further details of this 'modified upsampling' can be found in the modified upsampling in WO/2020/188242, which is incorporated by reference.

According to a further aspect of the present invention, there is provided a non-transitory computer readable medium comprising computer program code configured to cause a processor to implement the described methods.

All aspects of the present invention advantageously provide for implementations of a tier based decoder that can provide (e.g. protected) content in a secure manner.

BRIEF DESCRIPTION

Examples of systems and methods in accordance with the invention will now be described with reference to the accompanying drawings, in which:

FIG. 1 shows a known, high-level schematic of an LCEVC decoding process;

FIGS. 2*a* and 2*b* respectively show a schematic of a comparative base decoder and a schematic of a decoder integration layer in a video pipeline according to examples of the present disclosure;

FIG. 8 illustrates a flow chart of a method according to an embodiment of the invention;

DETAILED DESCRIPTION

This disclosure describes an implementation for integration of a hybrid backward-compatible coding technology with existing decoders, optionally via a software update. In a non-limiting example, the disclosure relates to an implementation and integration of MPEG-5 Part 2 Low Complexity Enhancement Video Coding (LCEVC). LCEVC is a hybrid backward-compatible coding technology which is a flexible, adaptable, highly efficient and computationally inexpensive coding format combining a different video coding format, a base codec (i.e. an encoder-decoder pair such as AVC/H.264, HEVC/H.265, or any other present or future codec, as well as non-standard algorithms such as VP9, AV1 and others) with one or more enhancement levels of coded data.

Example hybrid backward-compatible coding technologies use a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for being processed using a software implementation. Thus, streams are considered to be a base stream and one or more enhancement streams, where there are typically two enhancement streams possible but often one enhancement stream used. It is worth noting that typically the base stream may be decodable by a hardware decoder while the enhancement stream(s) may be suitable for software processing implementation with suitable power consumption. Streams can also be considered as layers.

The video frame is encoded hierarchically as opposed to using block-based approaches as done in the MPEG family of algorithms. Hierarchically encoding a frame includes generating residuals for the full frame, and then a reduced or decimated frame and so on. In the examples described herein, residuals may be considered to be errors or differences at a particular level of quality or resolution.

Figure 1:
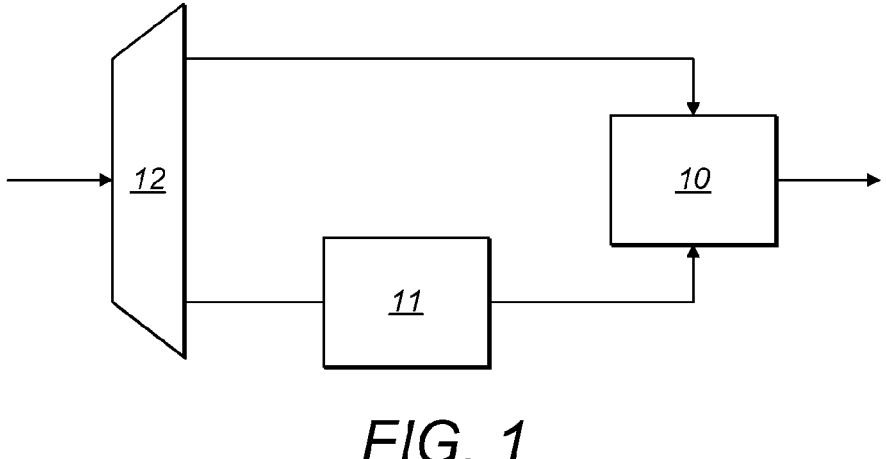

For context purposes only, as the detailed structure of LCEVC is known and set out in the approved draft standards specification, FIG. 1 illustrates, in a logical flow, how LCEVC operates on the decoding side assuming H.264 as the base codec. Those skilled in the art will understand how the examples described herein are also applicable to other multi-layer coding schemes (e.g., those that use a base layer and an enhancement layer) based on the general description of LCEVC that is presented with reference to FIG. 1. Turning to FIG. 1, the LCEVC decoder 10 works at individual video frame level. It takes as an input a decoded low-resolution picture from a base (H.264 or other) video decoder 11 and the LCEVC enhancement data to produce a decoded full-resolution picture ready for rendering on the display view. The LCEVC enhancement data is typically received either in Supplemental Enhancement Information (SEI) of the H.264 Network Abstraction Layer (NAL), or in an additional data Packet Identifier (PID) and is separated from the base encoded video by a demultiplexer 12. Hence, the base video decoder 11 receives a demultiplexed encoded base stream and the LCEVC decoder 10 receives a demultiplexed encoded enhancement stream, which is decoded by the LCEVC decoder 10 to generate a set of residuals for combination with the decoded low-resolution picture from the base video decoder 11.

LCEVC can be rapidly implemented in existing decoders with a software update and is inherently backwards-compatible since devices that have not yet been updated to decode LCEVC are able to play the video using the underlying base codec, which further simplifies deployment.

In this context, there is proposed herein a decoder implementation to integrate decoding and rendering with existing systems and devices that perform base decoding. The integration is easy to deploy. It also enables the support of a broad range of encoding and player vendors, and can be updated easily to support future systems. Embodiments of the invention specifically relate to how to implement LCEVC in such a way as to provide for decoding of protected content in a secure manner.

The proposed decoder implementation may be provided through an optimised software library for decoding MPEG-5 LCEVC enhanced streams, providing a simple yet powerful control interface or API. This allows developers flexibility and the ability to deploy LCEVC at any level of a software stack, e.g. from low-level command-line tools to integrations with commonly used open-source encoders and players. In particular, embodiments of the present invention generally relate to a driver level implementations and a System on a chip (SoC) level implementation.

The terms LCEVC and enhancement may be used herein interchangeably, for example, the enhancement layer may comprise one or more enhancement streams, that is, the residuals data of the LCEVC enhancement data.

Figure 2A:
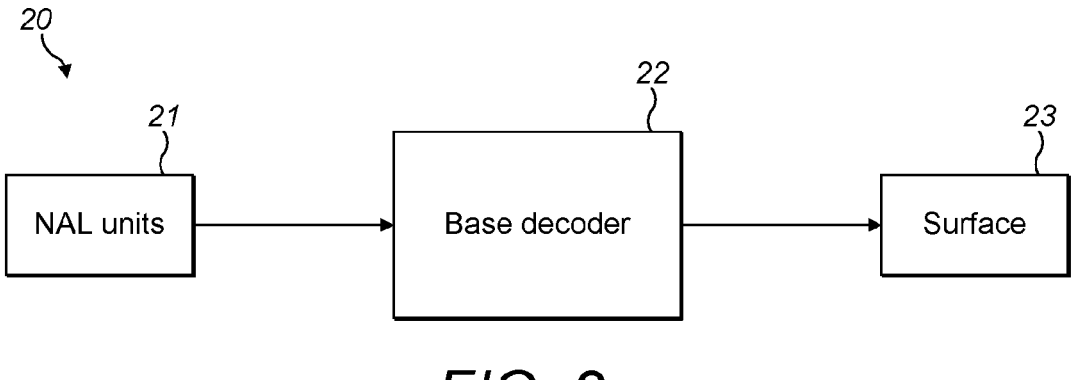

FIG. 2a illustrates an unmodified video pipeline 20. In this conceptual pipeline, obtained or received Network Abstraction Layer (NAL) units are input to a base decoder 22. The base decoder 22 may, for example, be a low-level media codec accessed using a mechanism such as Media-Codec (e.g. as found in the Android® operating system), VTDecompression Session (e.g. as found in the iOS® operating system) or Media Foundation Transforms (MFT—e.g. as found in the Windows® family of operating systems), depending on the operating system. The output of the pipeline is a surface 23 representing the decoded original video signal (e.g. a frame of such a video signal, where sequential display of success frames renders the video).

Figure 2B:
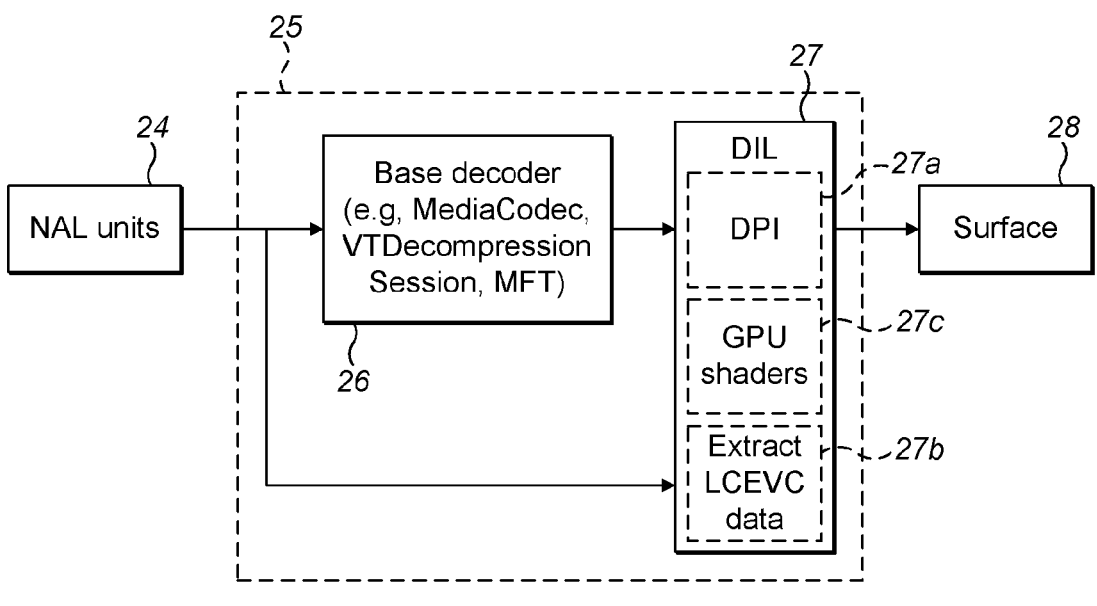

FIG. 2b illustrates a proposed video pipeline using an LCEVC decoder integration layer, conceptually. Like the comparative video decoder pipeline of FIG. 2a, NAL units 24 are obtained or received and are processed by an LCEVC decoder 25 to provide a surface 28 of reconstructed video data. Via the use of the LCEVC decoder 25, the surface 28 may be higher quality than the comparative surface 23 in FIG. 2a or the surface 28 may be at the same quality as the comparative surface 23 but require fewer processing and/or network resources.

In FIG. 2b, the LCEVC decoder 25 is implemented in conjunction with a base decoder 26. The base decoder 26 may be provided by a variety of mechanisms, including by an operating system function as discussed above (e.g. may use a MediaCodec, VTDecompression Session or MFT interface or command). The base decoder 26 may be hardware accelerated, e.g. using dedicated processing chips to implement operations for a particular codec. The base decoder 26 may be the same base decoder that is shown as 22 in FIG. 2a and that is used for other non-LCEVC video decoding, e.g. may comprise a pre-existing base decoder.

In FIG. 2b, the LCEVC decoder 25 is implemented using a decoder integration layer (DIL) 27. The decoder integration layer 27 acts to provide a control interface for the LCEVC decoder 25, such that a client application may use the LCEVC decoder 25 in a similar manner to the base decoder 22 shown in FIG. 2a, e.g. as a complete solution from buffer to output. The decoder integration layer 27 functions to control operation of a decoder plug-in (DPI) 27a and an enhancement decoder 27b to generate a decoded reconstruction of an original input video signal. In certain variations, as shown in FIG. 2b, the decoder integration layer may also control GPU functions 27c such as GPU shaders to reconstruct the original input video signal from the decoded base stream and the decoded enhancement stream.

NAL units 24 comprising the encoded video signal together with associated enhancement data may be provided in one or more input buffers. The input buffers may be fed (or made available) to the base decoder 26 and to the decoder integration layer 27, in particular the enhancement decoder that is controlled by the decoder integration layer 27. In certain examples, the encoded video signal may comprise an encoded base stream and be received separately from an encoded enhancement stream comprising the enhancement data; in other preferred examples, the encoded video signal comprising the encoded base stream may be received together with the encoded enhancement stream, e.g. as a single multiplexed encoded video stream. In the latter case, the same buffers may be fed (or made available) to both the base decoder 26 and to the decoder integration layer 27. In this case, the base decoder 26 may retrieve the encoded video signal comprising the encoded base stream and ignore any enhancement data in the NAL units. For example, the enhancement data may be carried in SEI messages for a base stream of video data, which may be ignored by the base decoder 26 if it is not adapted to process custom SEI message data. In this case, the base decoder 26 may operate as per the base decoder 22 in FIG. 2a, although in certain cases, the base video stream may be at a lower resolution that comparative cases.

On receipt of the encoded video signal comprising the encoded base stream, the base decoder 26 is configured to decode and output the encoded video signal as one or more base decoded frames. This output may then be received or accessed by the decoder integration layer 27 for enhancement. In one set of examples, the base decoded frames are passed as inputs to the decoder integration layer 27 in presentation order.

The decoder integration layer 27 extracts the LCEVC enhancement data from the input buffers and decodes the enhancement data. Decoding of the enhancement data is performed by the enhancement decoder 27b, which receives the enhancement data from the input buffers as an encoded enhancement signal and extracts residual data by applying an enhancement decoding pipeline to one or more streams of encoded residual data. For example, the enhancement decoder 27b may implement an LCEVC standard decoder as set out in the LCEVC specification.

A decoder plug-in is provided at the decoder integration layer to control the functions of the base decoder. In certain cases, the decoder plug-in 27a may handle receipt and/or access of the base decoded video frames and apply the LCEVC enhancement to these frames, preferably during playback. In other cases, the decoder plug-in may arrange for the output of the base decoder 26 to be accessible to the decoder integration layer 27, which is then arranged to control addition of a residual output from the enhancement decoder to generate the output surface 28. Once integrated in a decoding device, the LCEVC decoder 25 enables decoding and playback of video encoded with LCEVC enhancement. Rendering of a decoded, reconstructed video signal may be supported by one or more GPU functions 27c such as GPU shaders that are controlled by the decoder integration layer 27.

In general, the decoder integration layer 27 controls operation of the one or more decoder plug-ins and the enhancement decoder to generate a decoded reconstruction of the original input video signal 28 using a decoded video signal from the base encoding layer (i.e. as implemented by the base decoder 26) and the one or more layers of residual data from the enhancement encoding layer (i.e. as implemented by the enhancement decoder). The decoder integration layer 27 provides a control interface, e.g. to applications within a client device, for the video decoder 25.

Depending on configuration, the decoder integration layer may output the surface 28 of decoded data in different ways. For example, as a buffer, as an off-screen texture or as an on-screen surface. Which output format to use may be set in configuration settings that are provided upon creation of an instance of the decoding integration layer 27, as further explained below.

In certain implementations, where no enhancement data is found in the input buffers, e.g. where the NAL units 24 do not contain enhancement data, the decoder integration layer 27 may fall back to passing through the video signal at the lower resolution to the output, that is, the output of the base decoding layer as implemented by the base decoder 26. In this case, the LCEVC decoder 25 may operate as per the video decoder pipeline 20 in FIG. 2a.

The decoder integration layer 27 can be used for both application integration and operating system integration, e.g. for use by both client applications and operating systems. The decoder integration layer 27 may be used to control operating system functions, such as function calls to hardware accelerated base codecs, without the need for a client application to have knowledge of these functions. In certain cases, a plurality of decoder plug-ins may be provided, where each decoder plug-in provides a wrapper for a different base codec. It is also possible for a common base codec to have multiple decoder plug-ins. This may be the case where there are different implementations of a base codec, such as a GPU accelerated version, a native hardware accelerated version and an open-source software version.

When viewing the schematic diagram of FIG. 2b, the decoder plug-ins may be considered integrated with the base decoder 26 or alternatively a wrapper around that base decoder 26. Effectively FIG. 2b can be thought of as a stacked visualisation. The decoder integration layer 27 in FIG. 2b, conceptually includes functionality to extract the enhancement data from the NAL units 27b, functionality 27a to communicate with the decoder plug-ins and apply enhancement decoded data to base decoded data and one or more GPU functions 27c.

The set of decoder plug-ins are configured to present a common interface (i.e. a common set of commands) to the decoder integration layer 27, such that the decoder integration layer 27 may operate without knowledge of the specific commands or functionality of each base decoder. The plug-ins thus allow for base codec specific commands, such as MediaCodec, VTDecompression Session or MFT, to be mapped to a set of plug-in commands that are accessible by the decoder integration layer 27 (e.g. multiple different decoding function calls may be mapped to a single common plug-in "Decode( . . . )" function).

Since the decoder integration layer 27 effectively comprises a 'residuals engine', i.e. a library that from the LCEVC encoded NAL units produces a set of correction planes at different levels of quality, the layer can behave as a complete decoder (i.e. the same as decoder 22) through control of the base decoder.

For simplicity, we will refer to the instructing entity here as the client but it will be understood that the client may be considered to be any application layer or functional layer and that the decoder integration layer 27 may be integrated simply and easily into a software solution. The terms client, application layer and user may be used herein interchangeably.

In an application integration, the decoder integration layer 27 may be configured to render directly to an on-screen surface, provided by a client, of arbitrary size (generally different from the content resolution). For example, even though a base decoded video may be Standard Definition (SD), the decoder integration layer 27, using the enhancement data, may render surfaces at High Definition (HD), Ultra High Definition (UHD) or a custom resolution. Further details of out-of-standard methods of upscaling and post-processing that may be applied to a LCEVC decoded video stream are found in PCT/GB2020/052420, the contents of which are incorporated herein by reference. Example application integrations include, for example, use of the LCEVC decoder 25 by ExoPlayer, an application level media player for Android, or VLCKit, an objective C wrapper for the libVLC media framework. In these cases, VLCKit and/or ExoPlayer may be configured to decode LCEVC video streams by using the LCEVC decoder 25 "under the hood", where computer program code for VLCKit and/or Exo- Player functions is configured to use and call commands provided by the decoder integration layer 27, i.e. the control interface of the LCEVC decoder 25. A VLCKit integration may be used to provide LCEVC rendering on iOS devices and an ExoPlayer integration may be used to provide LCEVC rendering on Android devices.

In an operating system integration, the decoder integration layer 27 may be configured to decode to a buffer or draw on an off-screen texture of the same size of the content final resolution. In this case, the decoder integration layer 27 may be configured such that it does not handle the final render to a display, such as a display device. In these cases, the final rendering may be handled by the operating system, and as such the operating system may use the control interface provided by the decoder integration layer 27 to provide LCEVC decoding as part of an operating system call. In these cases, the operating system may implement additional operations around the LCEVC decoding, such as YUV to RGB conversion, and/or resizing to the destination surface prior to the final rendering on a display device. Examples of operating system integration include integration with (or behind) MFT decoder for Microsoft Windows® operating systems or with (or behind) Open Media Acceleration (OpenMAX—OMX) decoder, OMX being a C-language based set of programming interfaces (e.g. at the kernel level) for low power and embedded systems, including smartphones, digital media players, games consoles and set-top boxes.

These modes of integration may be set by a client device or application and the mechanism for selection and configuration will be described in more detail below.

The configuration of FIG. 2b, and the use of a decoder integration layer, allows LCEVC decoding and rendering to be integrated with many different types of existing legacy (i.e. base) decoder implementations. For example, the configuration of FIG. 2b may be seen as a retrofit for the configuration of FIG. 2a as may be found on computing devices. Further examples of integrations include the LCEVC decoding libraries being made available within common video coding tools such as FFmpeg and FFplay. For example, FFmpeg is often used as an underlying video coding tool within client applications. By configuring the decoder integration layer as a plug-in or patch for FFmpeg, an LCEVC-enabled FFmpeg decoder may be provided, such that client applications may use the known functionalities of FFmpeg and FFplay to decode LCEVC (i.e. enhanced) video streams. For example an LCEVC-enabled FFmpeg decoder may provide video decoding operations, such as: playback, decoding to YUV and running metrics (e.g. peak signal-to-noise ratio—PSNR or Video Multimethod Assessment Fusion-VMAF-metrics) without having to first decode to YUV. This may be possible by the plug-in or patch computer program code for FFmpeg calling functions provided by the decoder integration layer.

As described above, to integrate an LCEVC decoder such as 25 into a client, i.e. an application or operating system, a decoder integration layer such as 27 provides a control interface, or API, to receive instructions and configurations and exchange information.

Figure 3:
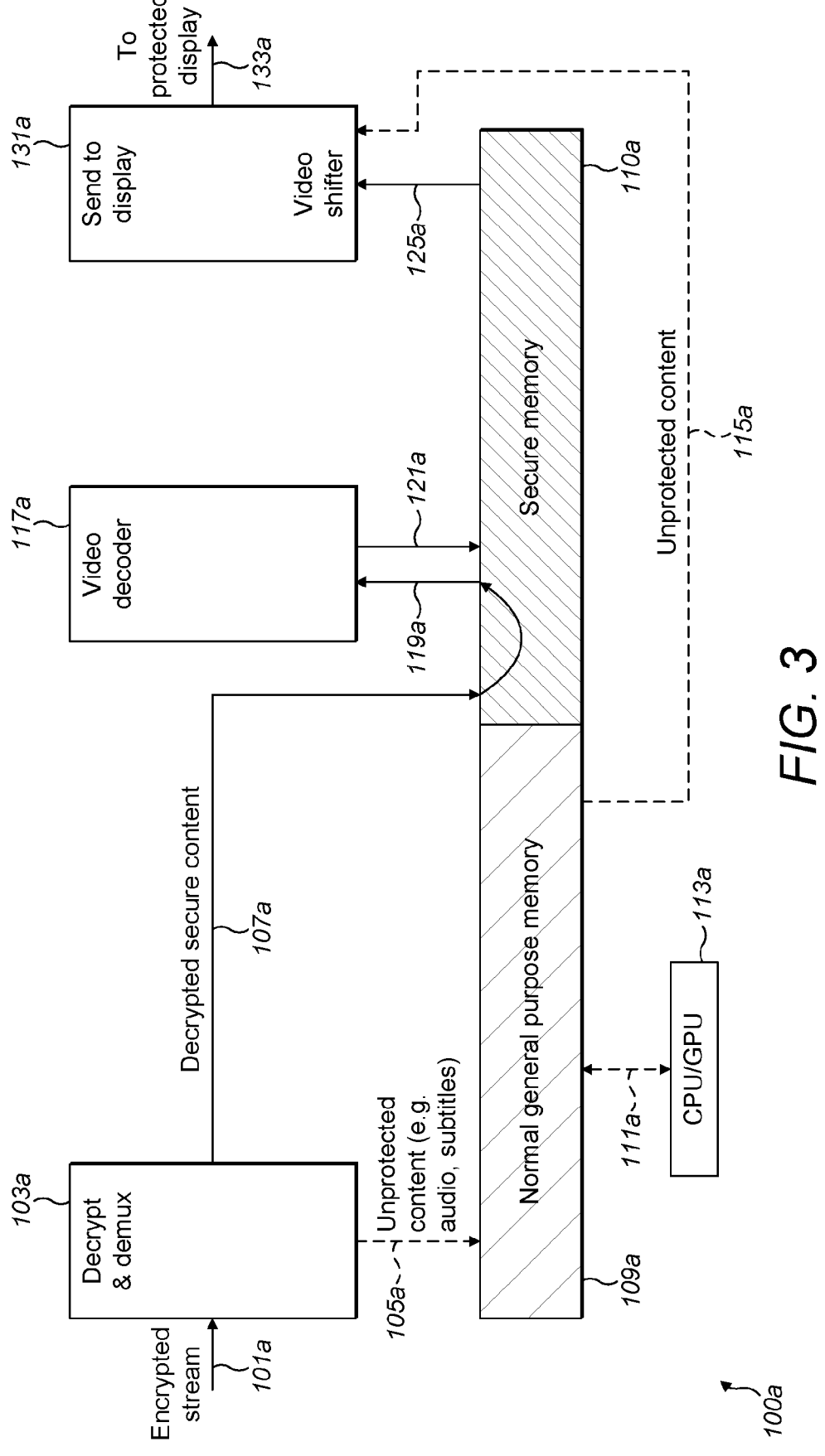
FIG. 3 illustrates a computing system having a video shifter of the prior art.

FIG. 3 illustrates a computing system 100a comprising a conventional video shifter 131a. The computing system 100a is configured to decode a video signal, where the video signal is encoded using a single codec, for example VVC, AVC or HEVC. In other words, the computing system 100a is not configured to decode a video signal encoded using a tier based codec such as LCEVC. The computing system 100a further comprises a receiving module 103a, a video decoding module 117a, an output module 131a, an unsecure memory 109a, a secure memory 110a, and a CPU or GPU 113a. The computing system 100a is in connection with a protected display (not illustrated).

The receiving module 103a is configured to receive an encrypted stream 101a, separate the encrypted stream, and output decrypted secure content 107a (e.g. decrypted encoded video signal, encoded using a single codec) to secure memory 110a. The receiving module 103a is configured to output unprotected content 105a, such as audio or subtitles, to the unsecure memory 109a. The unprotected content may be processed 111a by the CPU or GPU 113a. The (processed) unprotected content is output 115a to the video shifter 131a.

The video decoder 117a is configured to receive 119a the decrypted secure content (e.g. decrypted encoded video signal) and decode the decrypted secure content. The decoded decrypted secure content is sent 121a to the secure memory 110a and subsequently stored in the secure memory 110a. The decoded decrypted secure content is output 125a, from the secure memory, to the video shifter 131a.

In other words, the video shifter 131a: reads the decoded decrypted secure content 125a from the secure memory; reads 115a the, for example, subtitles from the unsecure memory 109a; combines the decoded decrypted secure content and the subtitles; and outputs the combined data 133a to a protected display.

Figure 4:
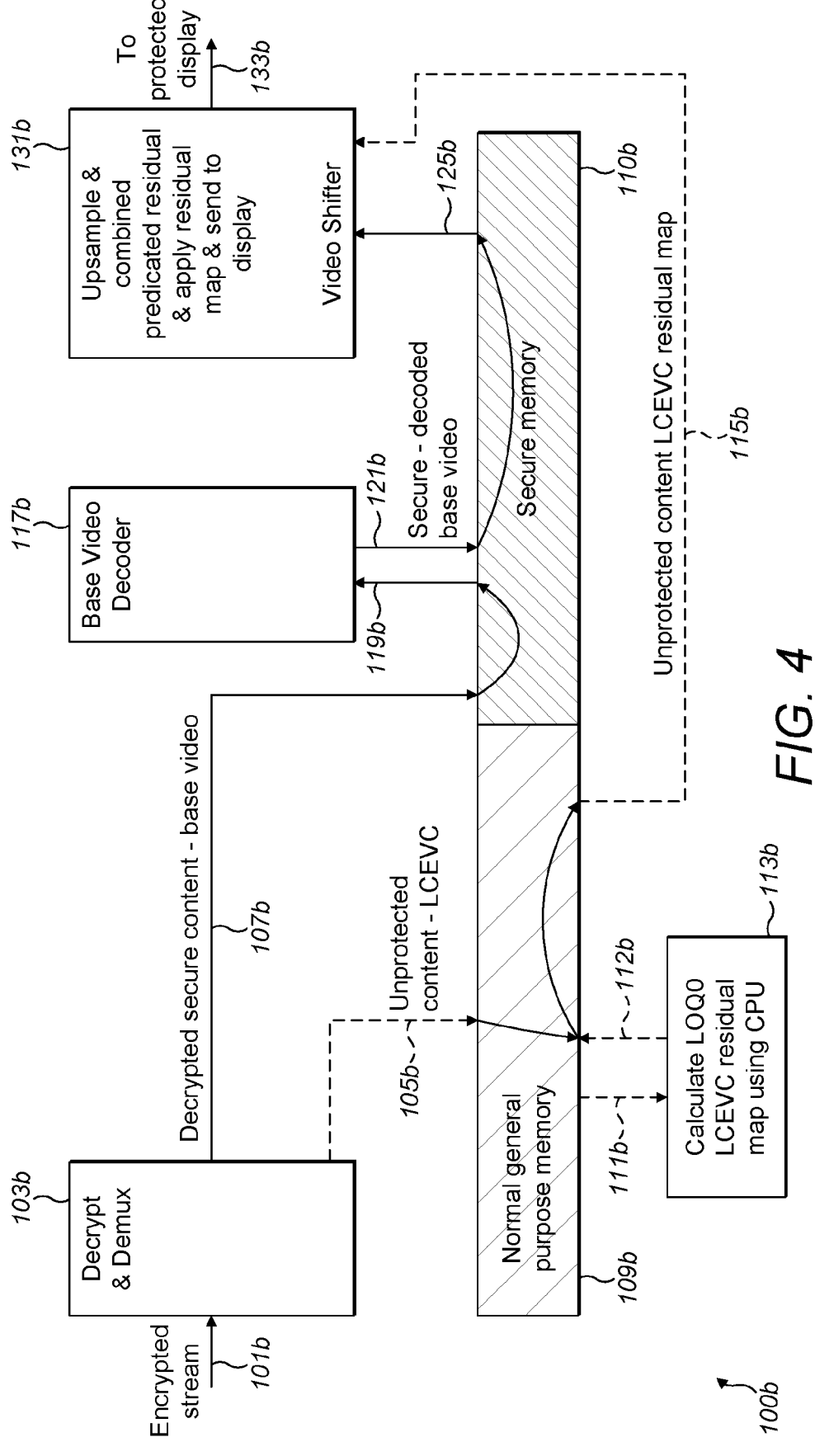
FIG. 4 illustrates an embodiment of the invention.

FIG. 4 illustrates an embodiment of the invention. In particular, FIG. 4 illustrate a computing system 100b. The computing system 100b comprises a receiving module 103b, a base decoding module 117b, an output module 131b, an enhancement layer decoding module 113b, an unsecure memory 109b, and a secure memory 110b. The computing system 100b is in connection with a protected display (not illustrated).

The output module 131b has access to the secure memory 110b and to the unsecure memory 109b. The output module 131b is configured to read, from the secure memory 110b (via a secured channel), a decrypted decoded rendition of a base layer 125b of a video signal. The decrypted decoded rendition of the base layer 125b has a first resolution. The output module 131b is configured to read, from the unsecure memory 109b (e.g. via an unsecured channel), a decoded rendition of an enhancement layer 115b of the video signal. The decoded rendition of the enhancement layer 115b has a second resolution. In this illustrated embodiment, the second resolution is higher than the first resolution, (However, this is not essential. The second resolution may be the same as the first resolution, in which case, upsampling may not be performed on the decrypted decoded rendition of the base layer.) The output module 131b is configured to generate an upsampled decrypted decoded rendition of the base layer of the video signal by upsampling the decrypted decoded rendition of the base layer 125b such that the upsampled decrypted decoded rendition of the base layer 125b has the second resolution. The output module 131b is configured to apply the decoded rendition of the enhancement layer 115b to the upsampled decrypted decoded rendition of the base layer to generate an output plane. The output module 131b is configured to output the output plane 133b, via a secured channel, to a protected display (not illustrated). In the computing system 100b, the output module is a video shifter.

The secure memory 110b is configured to receive, from the receiving module 103b, a decrypted encoded rendition of the base layer 107b of the video signal. The secure memory 110b is configured to output 119b the decrypted encoded rendition of the base layer to the base decoding module 117b. The secure memory 110b is configured to receive, from the base decoding module 117b, the decrypted decoded rendition of the base layer 121b of the video signal generated by the base decoding module 117b. The secure memory 110b is configured to store the decrypted decoded rendition of the base layer 121b.

The secure memory 110b is configured to output (via a secure channel), to the output module 131b, the decrypted decoded rendition of the base layer of the video signal 125b.

The computing system 100b comprises the unsecure memory 109b. The unsecure memory 109b is configured to receive, from the receiving module 103b (via an unsecured channel), and store an encoded rendition of the enhancement layer 105b of the video signal. The unsecure memory 109b is configured to output the encoded rendition of the enhancement layer 111b to the enhancement decoding module 113b configured to generate the decoded rendition of the enhancement layer 115b by decoding the encoded rendition of the enhancement layer 105b. The unsecure memory 109b is configured to receive, from the unsecure decoding module 113b, and store the decoded rendition of the enhancement layer 112b.

The computing system 100b comprises the receiving module 103b. The receiving module 103b is configured to receive, as a single stream, the video signal 101b. The video signal comprises the encrypted encoded rendition of the base layer 107b and the encoded rendition of the enhancement layer 105b. The receiving module 103b is configured to separate the video signal into: the encrypted encoded rendition of the base layer and the encoded rendition of the enhancement layer. The receiving module 103b is configured to decrypt the encrypted encoded rendition of the base layer. The receiving module 103b is configured to output the encoded rendition of the enhancement layer 105b to the unsecure memory 109b. The receiving module 103b is configured to output the decrypted encoded rendition of the base layer 107b to the secure memory 110b.

The received encoded rendition of the enhancement layer may be received by the receiving module 103b as an encrypted version of the encoded rendition of the enhancement layer. In such an embodiment, the receiving module 103b is configured to, before outputting the encoded rendition of the enhancement layer, decrypt the encrypted version of the encoded rendition of the enhancement layer to obtain the encoded rendition of the enhancement layer 105b.

The computing system 100b comprises the base decoding module 117b. The base decoding module 117b is configured to receive the decrypted encoded rendition of the base layer 119b of the video signal. The base decoding module 117b is configured to decode the decrypted encoded rendition of the base layer to generate a decrypted decoded rendition of the base layer. The base decoding module 117b is configured to output (121b), to the secure memory 110b for storage, the decrypted decoded rendition of the base layer 121b.

Predicted residuals, e.g. using a predicted average based on lower resolution data, as described in WO 2013/171173 (which is incorporated by reference] and as may be applied (such as in section 8.7.5 of LCEVC standard) as part of a modified upsampling procedure as described in WO/2020/188242 (incorporated by reference) may be processed by the output module 131b. WO/2020/188242 is particularly directed to section 8.7.5 of LCEVC, as the predicted averages are applied via what is referred to as "modified upsampling". In general, WO 2013/171173 describes the predicted average being computed/reconstructed at a pre-inverse-transformation stage (i.e. in transformed coefficient space) but the modified upsampling in WO/2020/188242 moves the application of the predicted average modifier outside of the pre-inverse-transformation stage and applies it during upsampling (in a post-inverse transformation or reconstructed image space), this is possible as the transforms are (e.g. simple) linear operations so the application of them can be moved within the processing pipeline. Therefore, the output module 131*b* may be configured to: generate the predicted residuals (in line with the methods described in WO/2020/188242); and apply the predicted residuals (generated by the modified upsampling) to the upsampled decrypted decoded rendition of the base layer (in addition to applying the decoded rendition of the enhancement layer 115*b*) to generate the output plane. In general, the output module 131*b* generates the predicted residuals by determining a difference between: an average of a 2 by 2 block of the upsampled decrypted decoded rendition of the base layer; and a value of a corresponding pixel of the (i.e. not upsampled) decrypted decoded rendition of the base layer.

Figure 5:
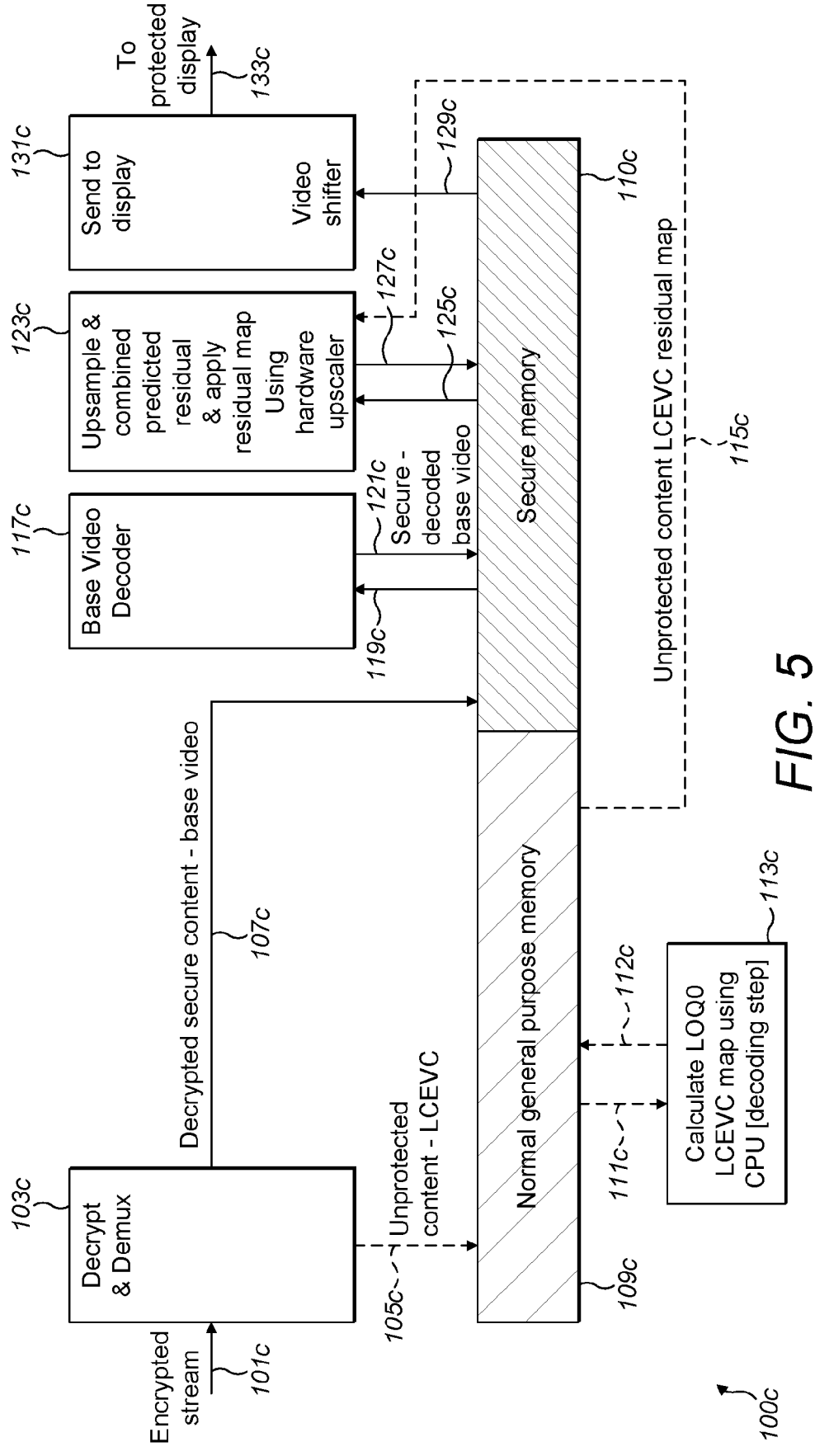
FIG. 5 illustrates an embodiment of the invention.

FIG. 5 illustrate an embodiment of the invention. FIG. 5 illustrates computing system 100*c*. The computing system 100*c* comprises a receiving module 103*c*, a base decoding module 117*c*, a module 123*c*, an output module 131*c*, an enhancement layer decoding module 113*c*, an unsecure memory 109*c*, and a secure memory 110*c*. The computing system 100*c* is in connection with a protected display (not illustrated).

The various components (i.e. the modules and the memory memory) are connected via a number of channels. The channels, also referred to as pipes, are communication channels that allow data to flow between the two components at each end of the channel. In general, channels connected to the secure memory 110*c* are secured channels. Channels connected to the unsecure memory 109*c* are unsecure channels. For ease of display, the channels are not explicit illustrated in the FIG. 5, rather, the data flow between various modules is shown. In the FIGS. 3-6, the flow of data along an unsecure channel is represented via a dashed lined arrow, the flow of data along a secure channel is represented via a solid lined arrow.

The computing system comprises a secure channel connecting the secure memory 110*c* to the receiving module 103*c*. The computing system comprises a secure channel connecting the secure memory 110*c* to the base decoding module 117*c*. The computing system comprises a secure channel connecting the secure memory 110*c* to the module 123*c*. The computing system comprises a secure channel connecting the secure memory 110*c* to the output module 131*c*.

The computing system comprises an unsecure channel connecting the unsecure memory 109*c* to the receiving module 103*c*. The computing system comprises an unsecure channel connecting the unsecure memory 109*c* to the enhancement decoding module 113*c*. The computing system comprises an unsecure channel connecting the unsecure memory 109*c* to the module 123*c*.

The receiving module 103*c* is connected to the unsecure memory 109*c* via an unsecured channel. The receiving module 103*c* is connected to the base decoding module 117*c* via a secured channel.

The unsecure memory 109*c* is connected to the module 123*c* via an unsecured channel. The unsecure memory 109*c* is connected to the enhancement layer decoding module 113*c* via an unsecured channel.

The secure memory 110*c* is connected to the receiving module 103*c* via a secured channel. The secure memory 110*c* is connected to the base decoding module 117*c* via a secured channel. The secure memory 110*c* is connected to the module 123*c* via a secured channel. The secure memory 110*c* is connected to the output module 131*c* via a secured channel. In other words, in the channels emanating from the secured memory 110*c* are all secured channels.

The module 123*c* is connected to the secure memory 110*c* via a secure channel.

The output module 131*c* is connected to the protected display (not shown) via a secure channel.

The module 123*c* has access to the secure memory 110*c* and to the unsecure memory 109*c*. The module 123*c* is configured to read, from the secure memory 110*c* (via a secured channel), a decrypted decoded rendition of a base layer 125*c* of a video signal. The decrypted decoded rendition of the base layer 125*c* has a first resolution. The module 123*c* is configured to read, from the unsecure memory 109*c* (via an unsecured channel), a decoded rendition an enhancement layer 115*c* of the video signal. The decoded rendition of the enhancement layer 115*c* has a second resolution. In this illustrated embodiment, the second resolution is higher than the first resolution, (However, this is not essential. The second resolution may be the same as the first resolution, in which case, upsampling may not be performed on the decrypted decoded rendition of the base layer.) The module 123*c* is configured to generate an upsampled decrypted decoded rendition of the base layer of the video signal by upsampling the decrypted decoded rendition of the base layer 125*c* such that the upsampled decrypted decoded rendition of the base layer 125*c* has the second resolution. The module 123*c* is configured to apply the decoded rendition of the enhancement layer 115*c* to the upsampled decrypted decoded rendition of the base layer to generate an output plane. The module 123*c* is configured to output the output plane 127*c*, via a secured channel, to the secure memory 110*c* for storage in the secure memory 110*c*.

In the embodiment illustrated in FIG. 5, the module 123*c* is a hardware scaling and compositing block as typically found within a Video decoder SoC.

As described above, predicted residuals, e.g. using a predicted average based on lower resolution data, as described in WO 2013/171173 (which is incorporated by reference) and as may be applied (such as in section 8.7.5 of LCEVC standard) as part of a modified upsampling procedure as described in WO/2020/188242 (incorporated by reference) may be generated and processed by the module 123*c*. WO/2020/188242 is particularly directed to section 8.7.5 of LCEVC, as the predicted averages are applied via what is referred to as "modified upsampling". In general, WO 2013/171173 describes the predicted average being computed/reconstructed at a pre-inverse-transformation stage (i.e. in transformed coefficient space) but the modified upsampling in WO/2020/188242 moves the application of the predicted average modifier outside of the pre-inverse-transformation stage and applies it during upsampling (in a post-inverse transformation or reconstructed image space), this is possible as the transforms are (e.g. simple) linear operations so the application of them can be moved within the processing pipeline. Therefore, the module 123*c* may be configured to: generate the predicted residuals (in line with the methods described in WO/2020/188242); and apply the predicted residuals (generated by the modified upsampling) to the upsampled decrypted decoded rendition of the base layer (in addition to applying the decoded rendition of the enhancement layer 115*c*) to generate the output plane. In general, the module 123*c* generates the predicted residuals by determining a difference between: an average of a (e.g. 2 by 2) block of the upsampled decrypted decoded rendition of the base layer; and a value of a corresponding pixel of the (i.e. not upsampled) decrypted decoded rendition of the base layer.

The secure memory 110c is configured to receive, from the receiving module 103c, a decrypted encoded rendition of the base layer 107c of the video signal. The secure memory 110c is configured to output 119c the decrypted encoded rendition of the base layer to the base decoding module 117c. The secure memory 110c is configured to receive, from the base decoding module 117c, the decrypted decoded rendition of the base layer 121c of the video signal generated by the base decoding module 117c. The secure memory 110c is configured to store the decrypted decoded rendition of the base layer 121c.

The secure memory 110c is configured to output (via a secure channel), to the module 123c, the decrypted decoded rendition of the base layer of the video signal 125c. The secure memory 110c is configured to receive, from the module 123c, the output plane 127c generated by the module 123c. The secure memory 110c is configured to store the output plane 127c. The secure memory 110c is configured to output (129c) the output plane 127c to the output module 131c.

The computing system 100c comprises the unsecure memory 109c. The unsecure memory 109c is configured to receive, from the receiving module 103c (via an unsecured channel), and store an encoded rendition of the enhancement layer 105c of the video signal. The unsecure memory 109c is configured to output the encoded rendition of the enhancement layer 111c to the enhancement decoding module 113c configured to generate the decoded rendition of the enhancement layer 115c by decoding the encoded rendition of the enhancement layer 105c. The unsecure memory 109c is configured to receive, from the unsecure decoding module 113c, and store the decoded rendition of the enhancement layer 112c.

The computing system 100c comprises the receiving module 103c. The receiving module 103c may be configured to receive, as a single stream, the video signal 101c. The video signal comprises the encrypted encoded rendition of the base layer 107c and the encoded rendition of the enhancement layer 105c. The receiving module 103c is configured to separate the video signal into: the encrypted encoded rendition of the base layer and the encoded rendition of the enhancement layer. The receiving module 103c is configured to decrypt the encrypted encoded rendition of the base layer. The receiving module 103c is configured to output the encoded rendition of the enhancement layer 105C to the unsecure memory 109c. The receiving module 103c is configured to output the decrypted encoded rendition of the base layer 107c to the secure memory 110c.

The received encoded rendition of the enhancement layer may be received by the receiving module 103c as an encrypted version of the encoded rendition of the enhancement layer. In such an embodiment, the receiving module 103c is configured to, before outputting the encoded rendition of the enhancement layer, decrypt the encrypted version of the encoded rendition of the enhancement layer to obtain the encoded rendition of the enhancement layer 105c.

The computing system 100c comprises the base decoding module 117c. The base decoding module 117c is configured to receive the decrypted encoded rendition of the base layer 119c of the video signal. The base decoding 117c is configured to decode the decrypted encoded rendition of the base layer to generate a decrypted decoded rendition of the base layer. The base decoding module 117c is configured to output (121c), to the secure memory 110c for storage, the decrypted decoded rendition of the base layer 121c.

The computing system 100c comprise the output module 131c. The output module 131c is configured to receive, from the secure memory 110c, the output plane 129c. The output module 131c is configured to output 133c the output plane to a protected display (not illustrated).

Figure 6:
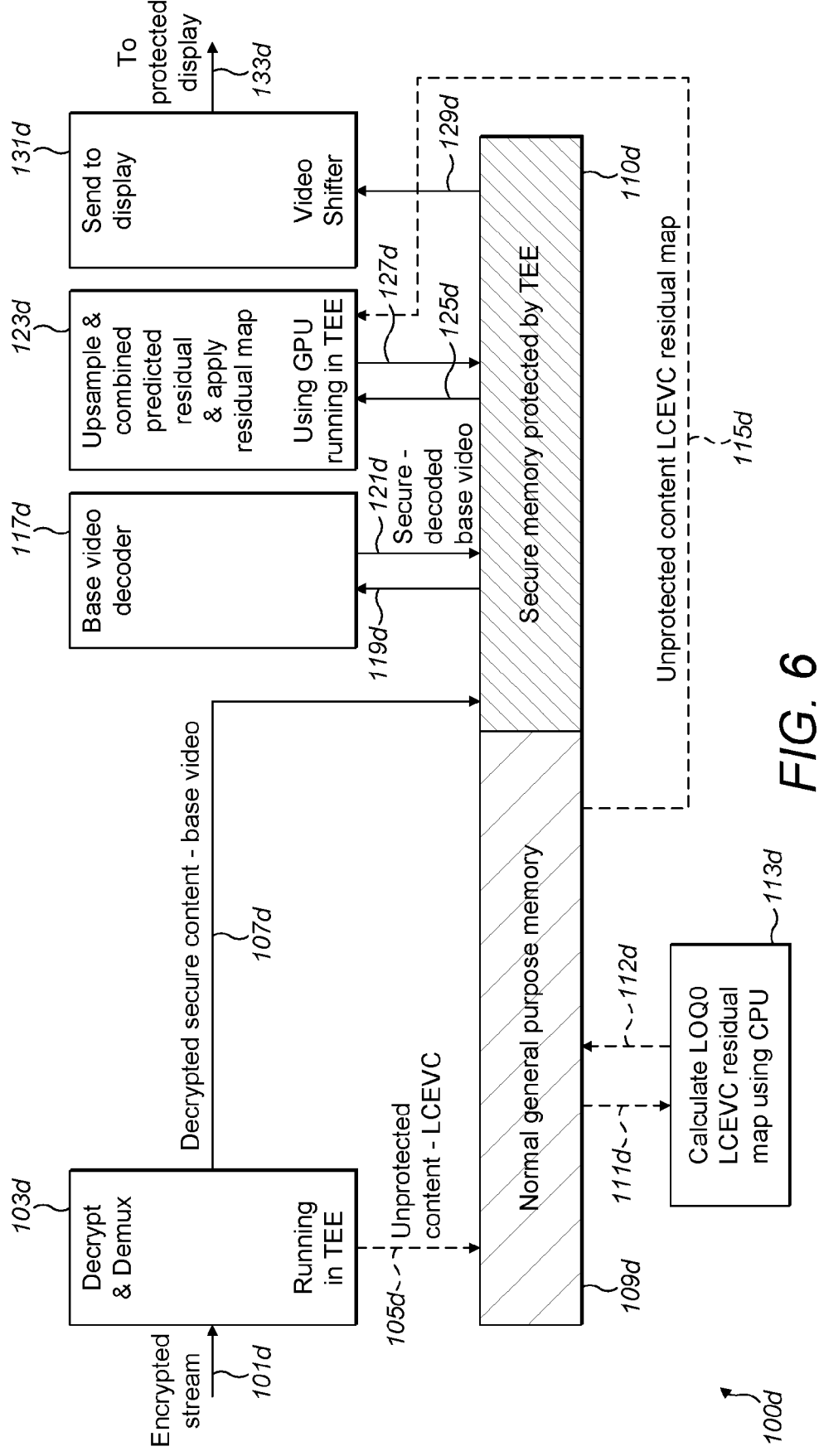
FIG. 6 illustrates an embodiment of the invention.

The embodiment of FIG. 6 corresponds largely to the embodiment of FIG. 5. This includes the flow of data throughout the computing system 100c corresponding to that of computing system 100d. The reference numerals of FIG. 6 correspond to that of FIG. 5 to illustrate the corresponding nature of the computing system 100c to that of the computing system 100d. A difference between the computing system 100c and the computing system 100d is that the module 123d is configured to perform the steps of upsample and combine with the Enhancement overlay using a GPU operating in the secure memory.

Figure 7:
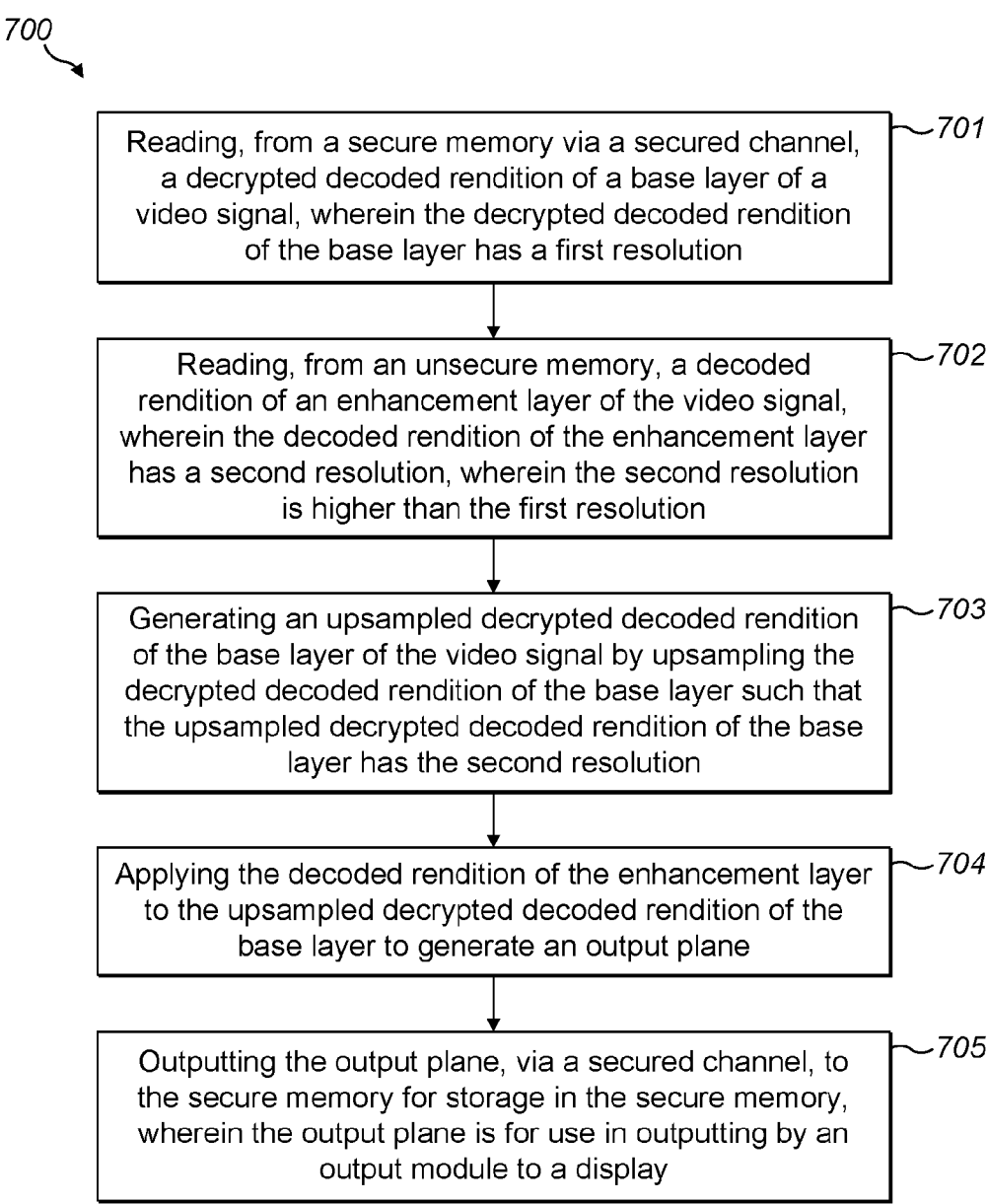
FIG. 7 illustrates a flow chart of a method according to an embodiment of the invention.

FIG. 7 illustrates a method 700 in accordance with an aspect of the invention. In embodiments, the method 700 is performed by the module 123c or 123d. The method 700 comprises reading 701, from the secure memory via a secured channel, a decrypted decoded rendition of a base layer of a video signal, wherein the decrypted decoded rendition of the base layer has a first resolution. The method 700 comprises reading 702, from an unsecure memory, a decoded rendition of an enhancement layer of the video signal, wherein decoded rendition of the enhancement layer has a second resolution, wherein the second resolution is higher than the first resolution. The method 700 comprises generating 703 an upsampled decrypted decoded rendition of the base layer of the video signal by upsampling the decrypted decoded rendition of the base layer such that the upsampled decrypted decoded rendition of the base layer has the second resolution. The method 700 comprises applying 704 the decoded rendition of the enhancement layer to the upsampled decrypted decoded rendition of the base layer to generate an output plane. The method 700 comprises outputting 705 the output plane, via the secure channel, to the secure memory for storage in the secure memory, wherein the output plane is for use in outputting by an output module to a display.

FIG. 8 illustrates a method 800 in accordance with an aspect of the invention. In embodiments, the method 800 is performed by the secure memory 110c or 110d. The method 800 comprises receiving 801, from a receiving module, via a secure channel, a decrypted encoded rendition of a base layer of a video signal. The method 800 comprises outputting 803, via a further secure channel, the decrypted encoded rendition of the base layer to a base decoding module. The method 800 comprises receiving 805, via the further secure channel from the base decoding module, a decrypted decoded rendition of the base layer generated by the base decoding module. The method 800 comprises storing 807 the decrypted decoded rendition of the base layer. The method 800 comprises outputting 809, via an additional secure channel, to a module, the decrypted decoded rendition of the base layer of the video signal. The method 800 comprises receiving 811, from the module via the additional secure channel, an output plane generated by the module. The method 800 comprises storing 813 the output plane. The method 800 comprises outputting 815 the output plane to an output module for sending to a display.

Figure 9:
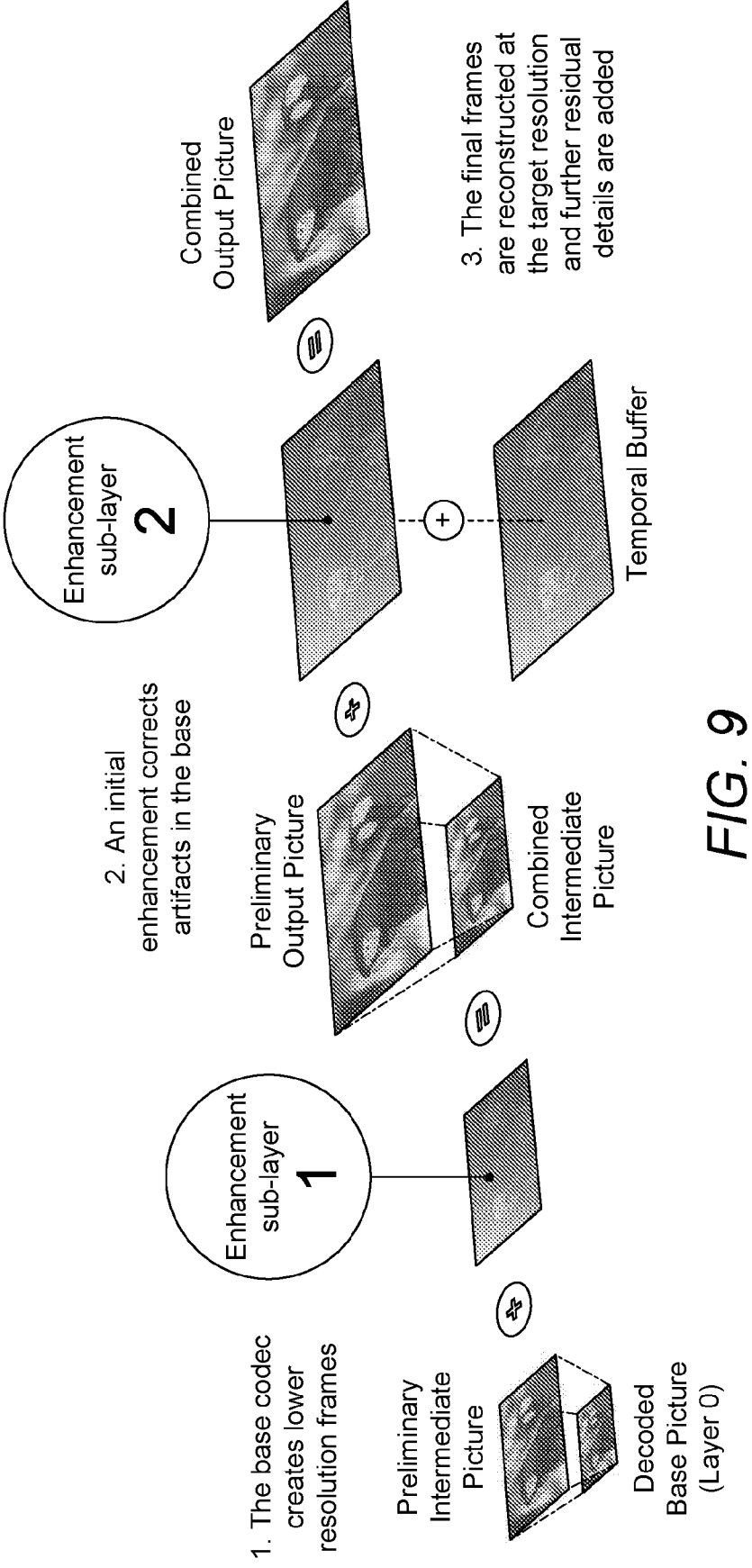
FIG. 9 illustrates a schematic of LCEVC.

FIG. 9 is a schematic diagram showing process flow of LCEVC. At a first step, a base decoder decodes a base layer to obtain low resolution frames (i.e. the base layer). As a next step, an initial enhancement (a sub layer of the enhancement layer) corrects artifacts in the base. As a further step, final frames (for output) are reconstructed at the target resolution by a applying further (e.g. further residual details) sub layer of the enhancement layer. This illustrates that by best exploiting the characteristics of existing codecs and the enhancement, LCEVC improves quality and reduces the overall computational requirements of encoding. Embodiments of the invention provide for this to be achieved in a secure manner (e.g. when handling protected content).

Figure 10:
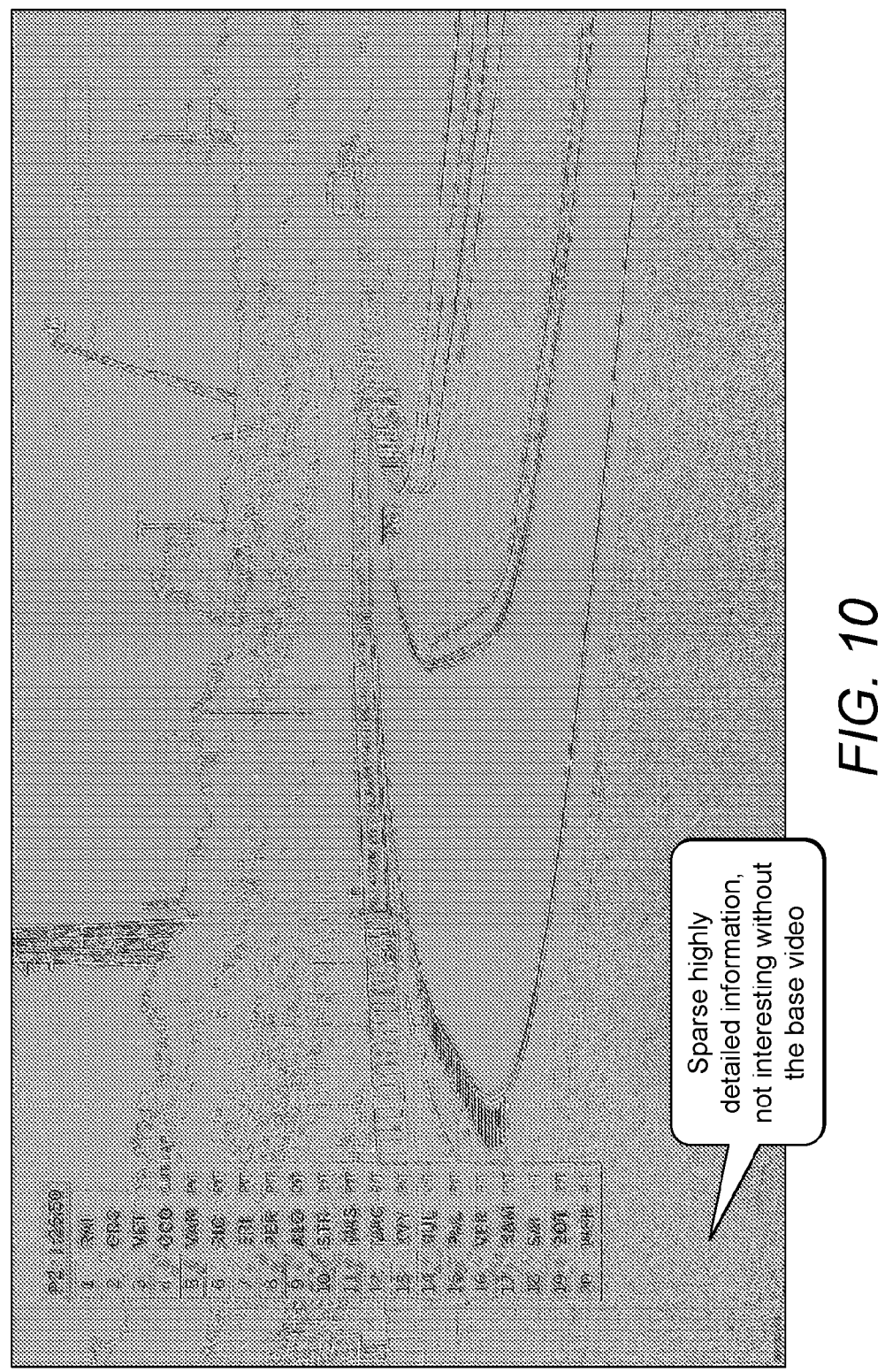
FIG. 10 illustrates an enhancement layer.

FIG. 10 illustrates an enhancement layer. As can be seen, the enhancement layer comprises sparse highly detailed information, which are not interesting (or valuable to a viewer) without the base video.

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A module having access to a secure memory and an unsecure memory, the module configured to:

read, from the secure memory via a secure channel, a decrypted decoded rendition of a base layer of a video signal, wherein the decrypted decoded rendition of the base layer has a first resolution;

read, from the unsecure memory, a decoded rendition of an enhancement layer of the video signal, wherein the decoded rendition of the enhancement layer has a second resolution, wherein the second resolution is higher than the first resolution, and wherein the enhancement layer comprises a residual map obtained from a difference between an original rendition of the video signal and a reconstituted rendition generated by upsampling the base layer;

generate an upsampled decrypted decoded rendition of the base layer of the video signal by upsampling the decrypted decoded rendition of the base layer such that the upsampled decrypted decoded rendition of the base layer has the second resolution;

apply the decoded rendition of the enhancement layer to the upsampled decrypted decoded rendition of the base layer to generate an output plane; and output the output plane, via the secured channel, to the secure memory for storage in the secure memory, wherein the output plane is for use in outputting by an output module to a display.

2. The module of claim 1 wherein the module is further configured to:

generate predicted residuals by processing the upsampled decrypted decoded rendition of the base layer and the decrypted decoded rendition of the base layer; and apply the predicted residuals to the upsampled decrypted decoded rendition of the base layer to generate the output plane.

3. A computing system comprising the module of claim 1.

4. The computing system of claim 3, wherein the computing system further comprises the secure memory, wherein the secured memory is configured to:

store the decrypted decoded rendition of the base layer of video signal;

output via the secure channel, to the module, the decrypted decoded rendition of the base layer of the video signal;

receive, from the module via the secure channel, the output plane generated by the module; and store the output plane.

5. The computing system of claim 3, wherein the computing system further comprises the secure memory, wherein the secured memory is configured to:

receive, from a receiving module, and store a decrypted encoded rendition of the base layer of the video signal;

output the decrypted encoded rendition of the base layer to a base decoding module;

receive, from the base decoding module, the decrypted decoded rendition of the base layer of the video signal generated by the base decoding module; and store the decrypted decoded rendition of the base layer.

6. The computer system of claim 3, the computing system further comprising the secure channel between the secure memory and the module.

7. The computing system of claim 3, the computing system further comprising the secure memory, wherein the secure memory is configured to: output the output plane to the output module.

8. The computing system of claim 3, the computing system further comprising the unsecure memory, wherein the unsecure memory is configured to:

receive, from a receiving module via an unsecured channel, and store an encoded rendition of the enhancement layer of the video signal;

output the encoded rendition of the enhancement layer to an enhancement decoding module configured to generate the decoded rendition of the enhancement layer by decoding the encoded rendition of the enhancement layer; and receive, from the unsecure decoding module via the unsecured channel, and store the decoded rendition of the enhancement layer.

9. The computing system of claim 3, the computing system further comprising the output module, the output module configured to:

receive, from the secure memory, the output plane; and output the output plane to a protected display.

10. The computing system of claim 3, wherein the output module is a module of a video shifter.

11. The computing system of claim 10, wherein the video shifter is further configured to perform one or more of:

resizing the output plane;

overlaying subtitles onto the output plane;

overlaying graphics onto the output plane;

sharpening the output plane;

performing a filter functions on the output plane.

12. The computing system of claim 3, wherein the module is a module of hardware block.

13. The computing system of claim 3, wherein the module is a processing unit operating in a trusted execution zone.

14. The computing system of claim 3, wherein the module is a module in a graphics processing unit (GPU).

15. The computing system of claim 3, wherein the module is a hardware upscaler operating in secure memory.

16. The computing system of claim 3, wherein the enhancement layer is compliant with the LCEVC standard.

17. A mobile phone or TV set top box comprising the computing system of claim 3.

18. A method comprising reading, from a secure memory via a secure channel, a decrypted decoded rendition of a base layer of a video signal, wherein the decrypted decoded rendition of the base layer has a first resolution;

reading, from an unsecure memory, a decoded rendition of an enhancement layer of the video signal, wherein the decoded rendition of the enhancement layer has a second resolution, wherein the second resolution is higher than the first resolution, and wherein the enhancement layer comprises a residual map obtained from a difference between an original rendition of the video signal and a reconstituted rendition generated by upsampling the base layer;

generating an upsampled decrypted decoded rendition of the base layer of the video signal by upsampling the decrypted decoded rendition of the base layer such that the upsampled decrypted decoded rendition of the base layer has the second resolution;

applying the decoded rendition of the enhancement layer to the upsampled decrypted decoded rendition of the base layer to generate an output plane; and outputting the output plane, via the secured channel, to the secure memory for storage in the secure memory, wherein the output plane is for use in outputting by an output module to a display.

19. A non-transitory computer readable medium comprising computer program code configured to cause a processor to perform the following:

read, from a secure memory via a secure channel, a decrypted decoded rendition of a base layer of a video signal, wherein the decrypted decoded rendition of the base layer has a first resolution;

read, from an unsecure memory, a decoded rendition of an enhancement layer of the video signal, wherein the decoded rendition of the enhancement layer has a second resolution, wherein the second resolution is higher than the first resolution, and wherein the enhancement layer comprises a residual map obtained from a difference between an original rendition of the video signal and a reconstituted rendition generated by upsampling the base layer;

generate an upsampled decrypted decoded rendition of the base layer of the video signal by upsampling the decrypted decoded rendition of the base layer such that the upsampled decrypted decoded rendition of the base layer has the second resolution;

apply the decoded rendition of the enhancement layer to the upsampled decrypted decoded rendition of the base layer to generate an output plane; and output the output plane, via the secured channel, to the secure memory for storage in the secure memory, wherein the output plane is for use in outputting by an output module to a display.

* * * * *